US012751594B2

(12) United States Patent
Hou

(10) Patent No.: US 12,751,594 B2
(45) Date of Patent: Oct. 6, 2026

(54) CLEANING ROBOT ESCAPE METHOD AND DEVICE, MEDIUM, AND ELECTRONIC APPARATUS

(71) Applicant: Beijing Roborock Innovation Technology Co., Ltd., Beijing (CN)

(72) Inventor: Zhengtao Hou, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 431 days.

(21) Appl. No.: 18/546,041

(22) PCT Filed: Jun. 9, 2021

(86) PCT No.: PCT/CN2021/099227
§ 371 (c)(1),
(2) Date: Aug. 10, 2023

(87) PCT Pub. No.: WO2022/170714
PCT Pub. Date: Aug. 18, 2022

(65) Prior Publication Data

US 2024/0049935 A1 Feb. 15, 2024

(30) Foreign Application Priority Data

Feb. 10, 2021 (CN) ......................... 202110184802.2

(51) Int. Cl.
*A47L 11/24* (2006.01)
*A47L 11/40* (2006.01)
(Continued)

(52) U.S. Cl.
CPC ........... *A47L 11/24* (2013.01); *A47L 11/4061* (2013.01); *G01C 21/206* (2013.01); *G05D 1/0255* (2013.01); *A47L 2201/04* (2013.01)

(58) Field of Classification Search
CPC ............... A47L 11/4061; A47L 9/2826; A47L 11/4036; A47L 11/24; A47L 11/4055;
(Continued)

(56) References Cited

U.S. PATENT DOCUMENTS 6,459,955 B1 * 10/2002 Bartsch ..................... A47L 9/00 318/587
7,953,526 B2 * 5/2011 Durkos ................ G05D 1/0221 701/25
(Continued)

FOREIGN PATENT DOCUMENTS

CN 103315683 A 9/2013
CN 206403708 U 8/2017
(Continued)

OTHER PUBLICATIONS

Chen et al., A design of large space automatic cleaning robot with omni-directional wheels, 2013, IEEE, p. 140-145 (Year: 2013).*
(Continued)

*Primary Examiner* — McDieunel Marc
(74) *Attorney, Agent, or Firm* — Calfee, Halter & Griswold LLP

(57) ABSTRACT

The present application relates to the technical field of intelligent home, and provides a cleaning robot escape method, a cleaning robot escape device, a computer-readable storage medium, and an electronic apparatus. The cleaning robot escape method includes: detecting, when the cleaning robot encounters an obstacle while cleaning along an edge of a first surface medium region and turns around, a second surface medium region in response to a surface medium change signal from the surface medium sensor, and determining whether a path allowing the cleaning robot to bypass the second surface medium region exists; controlling, if the path exists, the cleaning robot to travel along the path to avoid the second surface medium region; and ignor-
(Continued)

ing, if the path does not exist, the surface medium change signal from the surface medium sensor, and controlling the cleaning robot to turn around and return along an original path.

15 Claims, 14 Drawing Sheets

(51) Int. Cl.
*G01C 21/20* (2006.01)
*G05D 1/00* (2006.01)

(58) Field of Classification Search
CPC ............. A47L 11/4083; A47L 2201/04; G01C 21/206; G05D 1/639; G05D 1/6485; G05D 1/0255; G05D 2109/10; G05D 2107/40; G05D 2105/10
See application file for complete search history.

(56) References Cited

U.S. PATENT DOCUMENTS

| | | | | |
|---|---|---|---|---|
| 11,274,929 | B1 * | 3/2022 | Afrouzi | G06T 7/30 |
| 11,348,269 | B1 * | 5/2022 | Ebrahimi Afrouzi | G01S 17/48 |
| 2015/0032259 | A1 | 1/2015 | Kim et al. | |
| 2018/0035860 | A1 | 2/2018 | Tsuboi et al. | |
| 2018/0255997 | A1 | 9/2018 | So et al. | |
| 2018/0333869 | A1 | 11/2018 | Ding et al. | |
| 2018/0353043 | A1 | 12/2018 | Erkek et al. | |
| 2019/0008347 | A1 | 1/2019 | Senoo | |
| 2019/0015984 | A1 | 1/2019 | Kim et al. | |
| 2019/0258262 | A1 * | 8/2019 | Vicenti | G05D 1/0242 |
| 2020/0019181 | A1 | 1/2020 | Kim et al. | |
| 2021/0369069 | A1 * | 12/2021 | Peng | A47L 9/2826 |
| 2022/0071467 | A1 * | 3/2022 | Zhang | A47L 11/284 |
| 2024/0180384 | A1 * | 6/2024 | Hou | A47L 11/4069 |

FOREIGN PATENT DOCUMENTS

| | | | |
|---|---|---|---|
| CN | 107536565 | A | 1/2018 |
| CN | 107671862 | A | 2/2018 |
| CN | 107773164 | A | 3/2018 |
| CN | 107788913 | A | 3/2018 |
| CN | 108196555 | A | 6/2018 |
| CN | 108209745 | A | 6/2018 |
| CN | 108829115 | A | 11/2018 |
| CN | 109528089 | A | 3/2019 |
| CN | 109984688 | A | 7/2019 |
| CN | 110393477 | A | 11/2019 |
| CN | 110432832 | A | 11/2019 |
| CN | 110464262 | A | 11/2019 |
| CN | 110584547 | A | 12/2019 |
| CN | 110673597 | A | 1/2020 |
| CN | 110870720 | A | 3/2020 |
| CN | 110870721 | A | 3/2020 |
| CN | 111035327 | A | 4/2020 |
| CN | 111208811 | A | 5/2020 |
| CN | 111329395 | A | 6/2020 |
| CN | 210990005 | U | 7/2020 |
| CN | 111568306 | A | 8/2020 |
| CN | 211324788 | U | 8/2020 |
| CN | 111624991 | A | 9/2020 |
| CN | 111650933 | A | 9/2020 |
| CN | 111714030 | A | 9/2020 |
| CN | 111796290 | A | 10/2020 |
| CN | 111839360 | A | 10/2020 |
| CN | 111938510 | A | 11/2020 |
| CN | 212140334 | U | 12/2020 |
| CN | 112286191 | A | 1/2021 |
| JP | H07313418 | A | 12/1995 |
| KR | 20190105214 | A | 9/2019 |
| WO | 2020207173 | A1 | 10/2020 |

OTHER PUBLICATIONS

Dubey et al., An FPGA based service Robot for floor cleaning with autonomous navigation, 2016, IEEE, p. 1-6 (Year: 2016).*
Hasan et al., Path planning algorithm development for autonomous vacuum cleaner robots, 2014, IEEE, p. 1-6 (Year: 2014).*
Chen et al., Complete coverage motion control of a cleaning robot using infrared sensors, 2005, IEEE, p. 543-548 (Year: 2005).*
Kuo et al., Pneumatic Sensor: A Complete Coverage Improvement Approach for Robotic Cleaners, 2011, IEEE, p. 1237-1256 (Year: 2011).*
Lang et al., Coordination of behaviours for mobile robot floor cleaning, 1998, IEEE, p. 1236-121241 (Year: 1998).*
Park et al., A study on the cleaning algorithm for autonomous mobile robot under the unknown environment, 1997, IEEE, p. 70-75 (Year: 1997).*
Wang et al., The Robot Path Planning Algorithm in Indoor Environment, 2020, IEEE, p. 5350-5355 (Year: 2020).*
Extended European Search Report of application No. 21925368.9 dated Dec. 13, 2024.
Office action from Chinese Application No. 20211018480.2 dated May 7, 2022.
International Search Report From PCT/CN2021/099227 dated Sep. 28, 2021.
First Office Action of EP application No. 21925368.9 dated Sep. 26, 2025.
International Search Report of PCT application No. PCT/CN2021/099241 dated Nov. 9, 2021.
First Office Action of CN application No. 2021101848060 dated Apr. 15, 2022.
First Office Action of CN application No. 2022114581847 dated Jan. 8, 2026.

* cited by examiner

CLEANING ROBOT ESCAPE METHOD AND DEVICE, MEDIUM, AND ELECTRONIC APPARATUS

CROSS-REFERENCE TO RELATED APPLICATION(S)

The present disclosure is a 35 U.S.C. 371 national phase application of PCT International Application No. PCT/CN2021/099227 filed on Jun. 9, 2021, which claims priority to Chinese Patent Application No. 202110184802.2, filed on Feb. 10, 2021 and entitled "CLEANING ROBOT ESCAPE METHOD AND DEVICE, MEDIUM, AND ELECTRONIC APPARATUS", both of which are herein incorporated by reference in their entireties.

TECHNICAL FIELD

The present disclosure relates to the field of smart home, and in particular to a cleaning robot escape method and device, a computer-readable storage medium, and an electronic apparatus.

BACKGROUND ART

In recent years, with the rapid development of computer technologies and artificial intelligence science, intelligent robot technologies have gradually become a hot spot in the field of modern robot researches. Cleaning robots, as one of the most practical types of intelligent robots, can automatically complete the cleaning task of the ground by virtue of certain artificial intelligence.

At present, more and more homes are carpeted. After cleaning along a wall or carpet, the cleaning robot easily encounters an obstacle such as the carpet when turning around, and then gets trapped.

However, at present, there is no method to deal with the above trapped situation, and the cleaning robot can only remain trapped or wait for escape by a human.

SUMMARY OF THE INVENTION

According to an aspect of the present disclosure, a cleaning robot escape method is provided for a cleaning robot including a surface medium sensor. The method includes:

- detecting, when the cleaning robot performs cleaning along an edge of a first surface medium region and turns around, a second surface medium region in response to a surface medium change signal from the surface medium sensor, and determining whether a path allowing the cleaning robot to bypass the second surface medium region exists;
- controlling, if the path exists, the cleaning robot to travel along the path to avoid the second surface medium region; and
- ignoring, if the path does not exist, the surface medium change signal from the surface medium sensor, and controlling the cleaning robot to turn around and return along an original path.

In an exemplary embodiment of the present disclosure, the method further includes:

- searching in an established room map to determine whether the second surface medium region exists in the room map;
- determining, if the second surface medium region exists in the room map, whether the path exists based on a boundary of the second surface medium region and the room map, and controlling, if the path exists, the cleaning robot to travel along the path to avoid the second surface medium region and then enter a normal cleaning mode; and
- scanning, if the second surface medium region does not exist in the room map, an edge of the second surface medium region, and storing a scanning result in the room map.

In an exemplary embodiment of the present disclosure, during the process of ignoring the surface medium change signal from the surface medium sensor and controlling the cleaning robot to turn around and return along the original path, the method further includes:

- detecting whether the surface medium change signal from the surface medium sensor disappears; and
- controlling, if the surface medium change signal from the surface medium sensor disappears, the cleaning robot to continue advancing by a preset distance and then stop and rotate a single revolution, and detecting whether the cleaning robot has escaped from the second surface medium region.

In an exemplary embodiment of the present disclosure, the detecting whether the cleaning robot has escaped from the second surface medium region includes:

- controlling, if the surface medium sensor triggers the surface medium change signal, the cleaning robot to continue returning along the original path; and
- entering, if the surface medium sensor does not trigger the surface medium change signal, the normal cleaning mode.

In an exemplary embodiment of the present disclosure, the surface medium sensor triggering the surface medium change signal includes:

- controlling the surface medium sensor to transmit a signal perpendicularly to a current surface, and receiving an actual echo signal reflected by the current surface; and
- determining whether the actual echo signal is different from an echo signal from the first surface medium region, and triggering, if a difference exists, the surface medium change signal by the surface medium sensor,
- wherein the surface medium sensor is an ultrasonic sensor.

In an exemplary embodiment of the present disclosure, the controlling the cleaning robot to turn around and return along the original path includes:

- controlling, when it is determined that the cleaning robot has escaped from the second surface medium region, the cleaning robot to rotate in situ, so that a traveling direction of the cleaning robot is parallel to the edge of the first surface medium region; and
- controlling the cleaning robot to return in the traveling direction.

In an exemplary embodiment of the present disclosure, the method is used for the cleaning robot in a mode where only the first surface medium region is cleaned.

According to an aspect of the present disclosure, a cleaning robot escape device, disposed on a cleaning robot including a surface medium sensor, is provided. The device includes:

- a path determination module, configured for detecting, when the cleaning robot encounters an obstacle while cleaning along an edge of a first surface medium region and turns around, a second surface medium region in response to a surface medium change signal from the surface medium sensor, and determining whether a path allowing the cleaning robot to bypass the second surface medium region exists;

a first control module, configured for controlling, if the path exists, the cleaning robot to travel along the path to avoid the second surface medium region; and a second control module, configured for ignoring, if the path does not exist, the surface medium change signal from the surface medium sensor, and controlling the cleaning robot to turn around and return along an original path.

According to an aspect of the present disclosure, a computer-readable storage medium, in which a computer program is stored, is provided. The computer program is configured, when executed by a processor, to implement the cleaning robot escape method as described above.

According to an aspect of the present disclosure, an electronic apparatus is provided. The electronic apparatus includes:

a processor; and a memory, configured for storing an executable instruction executable by the processor, wherein the processor is configured, when executing the executable instruction, to perform the cleaning robot escape method as described above.

It should be understood that both the general description above and the detailed description below are exemplary and explanatory only, and are not intended to limit the present disclosure.

BRIEF DESCRIPTION OF THE DRAWINGS

The accompanying drawings herein, which are incorporated in the Description and constitute a part of the Description, show embodiments conforming to the present disclosure, and are used to explain the principles of the present disclosure together with the Description. Apparently, the accompanying drawings in the following description are only some embodiments of the present disclosure. For those of ordinary skills in the art, other drawings may also be obtained from these accompanying drawings without creative efforts.

DETAILED DESCRIPTION

Figure 1:
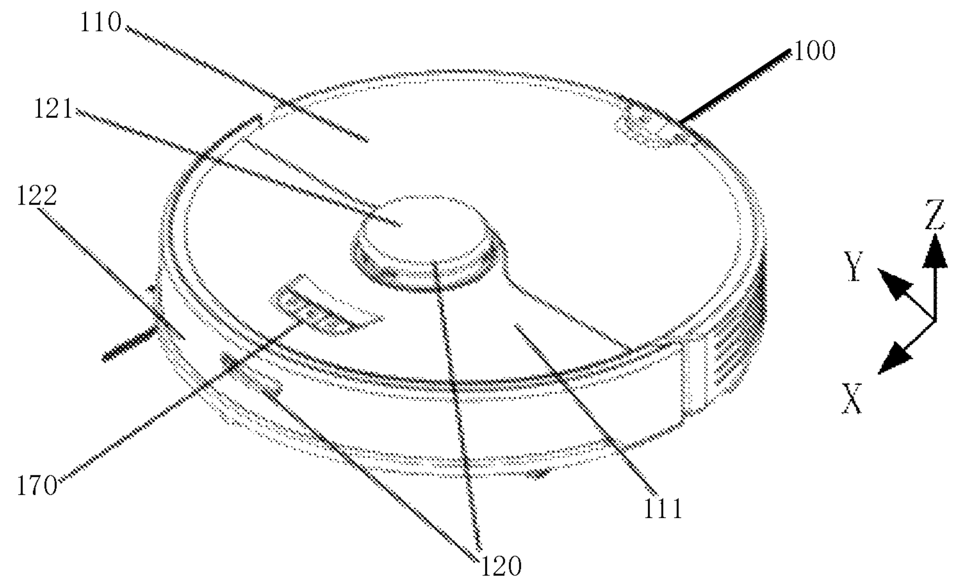
FIG. 1 is an oblique view of an automatic cleaning apparatus according to an embodiment of the present disclosure.

Exemplary embodiments will now be described more fully with reference to the accompanying drawings. However, these exemplary embodiments may be implemented in a variety of forms, and should not be understood as being limited to the examples described herein. On the contrary, these embodiments are provided such that the present disclosure will become comprehensive and complete, and the conception of the exemplary embodiments is fully conveyed to those skilled in the art. Identical reference signs in the drawings represent identical or similar structures, and their detailed description will be omitted accordingly.

Although relativistic terms are used in the Description, for example, "upper" and "lower", to describe a relative relationship of a component represented by a reference sign with respect to another component, these terms are used in the Description for convenience only, for example, based on the direction shown by an example in the drawings. It will be appreciated that, if the device represented by a reference sign is flipped upside down, the described "upper" component will become a "lower" component. Other relativistic terms, for example, "high", "low", "top", "bottom", "left", "right", or the like, also have similar meanings. When a structure is "on" another structure, it may refer to that the structure is integrally formed on the other structure, or that the structure is "directly" disposed on the other structure, or that the structure is "indirectly" disposed on the other structure by means of a third structure.

The terms "a", "an", and "the" are used to indicate the existence of one or more elements, components, or the like. The terms "comprise" and "have" are used to indicate the non-exclusive inclusion, and refer to the possible existence of additional elements, components, or the like, in addition to the elements, components as listed.

Figure 2:
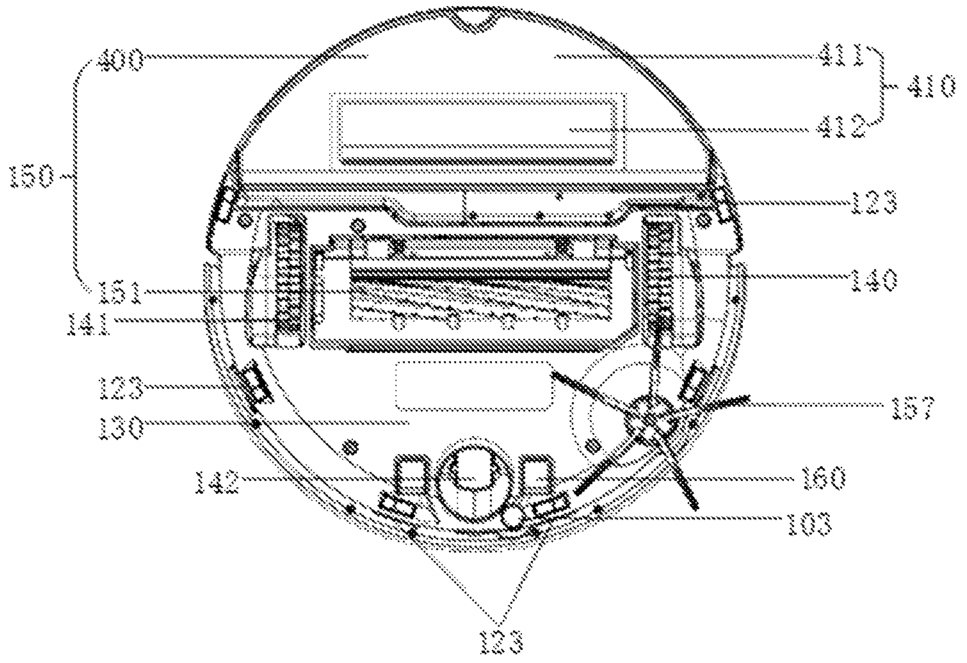
FIG. 2 is a schematic structural diagram of a bottom of an automatic cleaning apparatus according to an embodiment of the present disclosure.

FIGS. 1-2 are schematic structural diagrams of an automatic cleaning apparatus according to an exemplary embodiment. As shown in FIGS. 1-2, the automatic cleaning apparatus may be a vacuum ground sucking robot, or may be a ground mopping/brushing robot, or may be a window climbing robot, or the like. The automatic cleaning apparatus may include a mobile platform 100, a sensing system 120, a control system 130, a driving system 140, a cleaning module 150, an energy system 160, and a human-computer interaction system 170.

The mobile platform 100 may be configured to move automatically along a target direction on an operation surface. The operation surface may be a surface to be cleaned by the automatic cleaning apparatus. In some embodiments, the automatic cleaning apparatus may be a ground mopping robot. Thus, the automatic cleaning apparatus operates on a ground, and the ground is the operation surface. The automatic cleaning apparatus may also be a window cleaning robot. Thus, the automatic cleaning apparatus operates on an outer surface of glass of a building, and the glass is the operation surface. The automatic cleaning apparatus may also be a pipe cleaning robot. Thus, the automatic cleaning apparatus operates on an inner surface of a pipe, and the inner surface of the pipe is the operation surface. For the purpose of presentation only, the following description in the present application takes a ground mopping robot as an example for illustration.

In some embodiments, the mobile platform 100 may be an autonomous mobile platform, or a non-autonomous mobile platform. The autonomous mobile platform indicates that the mobile platform 100 itself can automatically and adaptively make an operational decision based on an unexpected environmental input. The non-autonomous mobile platform itself cannot adaptively make an operational decision based on an unexpected environmental input, but only execute a given procedure or operate according to a certain logic. Accordingly, when the mobile platform 100 is the autonomous mobile platform, the target direction may be determined autonomously by the automatic cleaning apparatus; and when the mobile platform 100 is the non-autonomous mobile platform, the target direction may be set systematically or manually. When the mobile platform 100 is the autonomous mobile platform, the mobile platform 100 includes a forward portion 111 and a rearward portion 110.

The sensing system 120 includes: a position determination device 121 located on the mobile platform 100, a buffer 122 located at the forward portion 111 of the mobile platform 100, and sensing devices, such as a cliff sensor 123, an ultrasonic sensor (not shown), an infrared sensor (not shown), a magnetometer (not shown), an accelerometer (not shown), a gyroscope (not shown), an odometer (not shown), and the like, located at a bottom of the mobile platform 100, and configured for providing various position information and motion state information of the automatic cleaning apparatus to the control system 130.

In order to describe operations of the automatic cleaning apparatus more clearly, directions are defined as follows. The automatic cleaning apparatus may travel on the ground by various combinations of movements relative to the following three mutually perpendicular axes defined by the mobile platform 100, i.e., a transversal axis x, a front and rear axis y, and a center vertical axis z. A forward driving direction along the front and rear axis y is designated as "forward", and a rearward driving direction along the front and rear axis y is designated as "rearward". The transversal axis x extends substantially along a direction, passing an axis center defined by a center point of a driving wheel assembly 141, between a right wheel and a left wheel of the automatic cleaning apparatus. The automatic cleaning apparatus may rotate around the x axis. When the forward portion of the automatic cleaning apparatus is tilted upward and the rearward portion thereof is tilted downward, the automatic cleaning apparatus is referred to as "pitching up". When the forward portion of the automatic cleaning apparatus is tilted downward and the rearward portion thereof is tilted upward, the automatic cleaning apparatus is referred to as "pitching down". In addition, the automatic cleaning apparatus may rotate around the z axis. In a forward direction of the automatic cleaning apparatus, it is referred to as "turning right" when the automatic cleaning apparatus is tilted to the right of the y axis, and it is referred to as "turning left" when the automatic cleaning apparatus is tilted to the left of the y axis.

As shown in FIG. 2, at the bottom of the mobile platform 100, the cliff sensors 123 are provided in front and rear of the driving wheel assembly 141 respectively, for preventing the automatic cleaning apparatus from falling off when the automatic cleaning apparatus retreats, so as to avoid damages to the automatic cleaning apparatus. The aforementioned wording "front" refers to a side towards a traveling direction of the automatic cleaning apparatus, and the aforementioned wording "rear" refers to a side opposite to the traveling direction of the automatic cleaning apparatus.

The position determination device 121 includes, but is not limited to, a camera and a laser distance sensor (LDS) device.

Various components in the sensing system 120 may operate independently, or operate together to achieve a target function more accurately. The surface to be cleaned is identified by the cliff sensors 123 and the ultrasonic sensor to determine physical properties of the surface to be cleaned, including a surface medium, a degree of cleanliness, and the like. A more accurate determination may be made in combination with the camera, the LDS device, or the like.

For example, the ultrasonic sensor may determine whether the surface to be cleaned is a carpet. If the ultrasonic sensor determines that the surface to be cleaned is made of a carpet material, the control system 130 controls the automatic cleaning apparatus to perform cleaning in a carpet mode.

The forward portion 111 of the mobile platform 100 is provided with the buffer 122. During cleaning, when the driving wheel assembly 141 propels the automatic cleaning apparatus to travel on the ground, the buffer 122 may detect one or more events (or objects) in a traveling path of the automatic cleaning apparatus via a sensor system, e.g., an infrared sensor. In this case, the automatic cleaning apparatus may control the driving wheel assembly 141 based on the event (or object), such as an obstacle and a wall, detected by the buffer 122, so that the automatic cleaning apparatus is caused to respond to the event (or object), for example, to move away from the obstacle.

The control system 130 is disposed on a main circuit board in the mobile platform 100, and includes a computing processor, such as a central processing unit or an application processor, that communicates with a non-transitory memory, such as a hard disk, a flash memory, and a random-access memory. The application processor is configured to receive environmental information sensed by the plurality of sensors and transmitted from the sensing system 120. Thus, a simultaneous map may be created of an environment, where the automatic cleaning apparatus is located, using a positioning algorithm e.g., simultaneous localization and mapping (SLAM), based on obstacle information fed back by the LDS; a traveling path may be autonomously determined based on the environmental information and the environmental map; and then the driving system 140 may be controlled to perform operations, such as traveling forward, traveling backward, and/or steering, based on the autonomously determined traveling path. Further, the control system 130 may also determine whether to activate the cleaning module 150 to perform a cleaning operation based on the environmental information and the environmental map.

Specifically, the control system 130 may, based on distance information and speed information which are fed back by the buffer 122, the cliff sensors 123 and the sensing devices such as the ultrasonic sensor, the infrared sensor, the magnetometer, the accelerometer, the gyroscope, and the odometer, comprehensively determine a current operation state of the ground sweeping robot, such as crossing over a threshold, getting onto a carpet, locating at an edge of a cliff, being trapped from above or below, having a full dust box, or being picked up. Further, the control system 130 may also give specific strategies about the next-step operation for different situations, so that the operation of the automatic cleaning apparatus is more conforming to requirements of an owner and a better user experience is provided. Besides, the control system may plan the most efficient and reasonable cleaning path and cleaning mode based on the simultaneous map created by the SLAM, thereby greatly improving the cleaning efficiency of the automatic cleaning apparatus.

Figure 3:
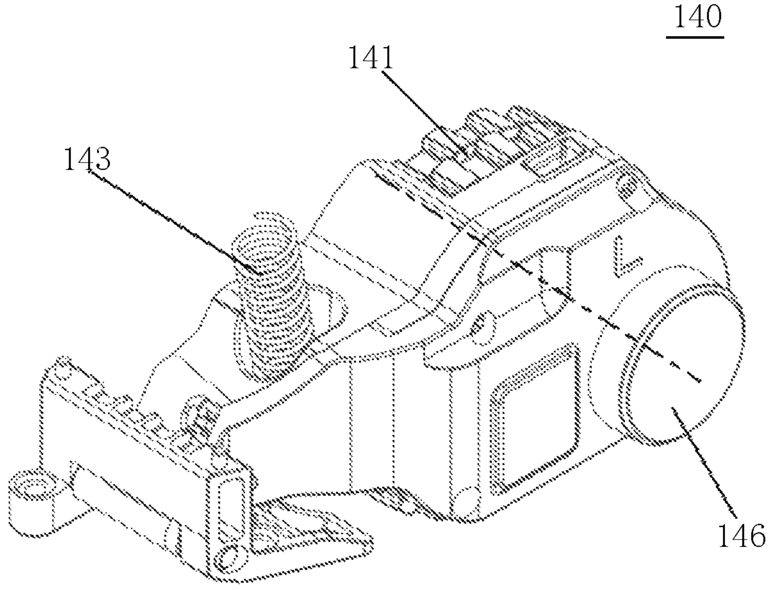
FIG. 3 is an oblique view of a driving wheel assembly on a side according to an embodiment of the present disclosure.
Figure 4:
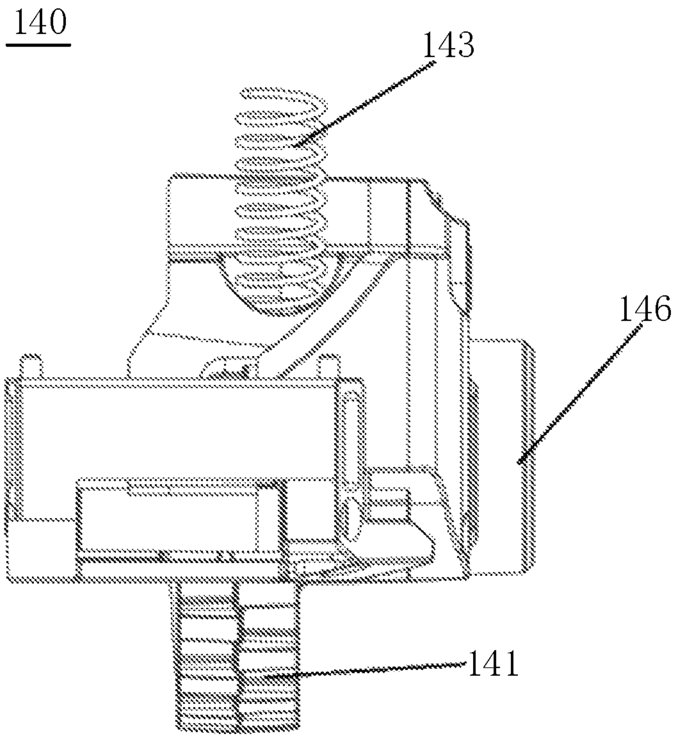
FIG. 4 is a front view of a driving wheel assembly on a side according to an embodiment of the present disclosure.

The driving system 140 may execute a driving command based on specific distance and angle information, such as x, y, and theta components, to manipulate the automatic cleaning apparatus to travel across the ground. FIG. 3 and FIG. 4 are an oblique view and a front view respectively of a driving wheel assembly 141 on a side according to an embodiment of the present disclosure. As shown in the figures, the driving system 140 includes the driving wheel assembly 141, and the driving system 140 may control a left wheel and a right wheel simultaneously. In order to control the motion of the automatic cleaning apparatus more precisely, the driving system 140 preferably includes a left driving wheel assembly and a right driving wheel assembly. The left driving wheel assembly and the right driving wheel assembly are arranged symmetrically along a transversal axis defined by the mobile platform 100. The driving wheel assembly includes a housing and a connection frame, and is internally provided with a driving motor 146. The driving motor 146 is located outside the driving wheel assembly 141, an axis center of the driving motor 146 is located within a sectional projection of the driving wheel assembly, and the driving wheel assembly 141 may also be connected to a circuit for measuring a driving current and the odometer.

In order for the automatic cleaning apparatus to move on the ground more stably or have a stronger movement ability, the automatic cleaning apparatus may include one or more steering assemblies 142. The steering assembly 142 may be a driven wheel or a driving wheel, and structurally includes but is not limited to a universal wheel. The steering assembly 142 may be located in front of the driving wheel assembly 141.

The driving motor 146 provides power for rotation of the driving wheel assembly 141 and/or the steering assembly 142.

The driving wheel assembly 141 may be detachably connected to the mobile platform 100 to facilitate assembly, disassembly, and maintenance. The driving wheel may have an offset drop suspension system, which is movably fastened, e.g., rotatably attached, to the mobile platform 100 of the automatic cleaning apparatus. The driving wheel may maintain contact and traction with the ground by an elastic element 143 such as a tension spring or a compression spring with a certain grounding force. In the meanwhile, the cleaning module 150 of the automatic cleaning apparatus is also in contact with the surface to be cleaned with a certain pressure.

The energy system 160 includes a rechargeable battery, such as a nickel-hydride battery and a lithium battery. The rechargeable battery may be connected with a charging control circuit, a battery pack charging temperature monitoring circuit, and a battery undervoltage monitoring circuit. The charging control circuit, the battery pack charging temperature monitoring circuit, and the battery undervoltage monitoring circuit are then connected to a single-chip microcomputer control circuit. For the purpose of charging, a host of the automatic cleaning apparatus is connected to a charging pile through a charging electrode disposed on a side of or below a body of the automatic cleaning apparatus. If dust is attached to the exposed charging electrode, due to the accumulation effect of charge during charging, the plastic body around the electrode may be molten and deform, which even leads to the deformation of the electrode per se, causing that the normal charging process cannot be continued.

The human-computer interaction system 170 includes buttons that are disposed on a panel of the host and used by a user to select functions. The human-computer interaction system 170 may further include a display screen and/or an indicator light and/or a horn that present a current state or function item of the automatic cleaning apparatus to the user. The human-computer interaction system 170 may further include a mobile client program. For a route navigation type of cleaning apparatus, a mobile client may present a map of the environment where the apparatus is located and a position of the apparatus to the user, which may provide richer and more user-friendly function items to the user.

The cleaning module 150 may include a dry cleaning module 151 and/or a wet cleaning module 400.

As shown in FIGS. 5-8, the dry cleaning module 151 includes a rolling brush, a dust box, a blower, and an air outlet. The rolling brush having a certain interference with the ground sweeps up garbage on the ground and rolls up the garbage to the front of a dust suction inlet between the rolling brush and the dust box. Then, the garbage is sucked into the dust box by air having a suction force, which air is generated by the blower and passes through the dust box. A dust removal capacity of the ground sweeping robot may be characterized by a dust pickup efficiency (DPU) of the garbage. The DPU is affected by structure and material of the rolling brush, by a utilization rate of air in an air channel formed by the dust suction inlet, the dust box, the blower, the air outlet, and connection components among the four, and by type and power of the blower, which is a complex systematic design problem. Compared to an ordinary plug-in vacuum cleaner, the improvement of the dust removal capacity is more meaningful for an automatic cleaning apparatus with limited energy, because the improvement of the dust removal capacity directly and effectively reduces requirements for energy. That is, the conventional cleaning apparatus that may clean 80 square meters of the ground on a single charge may be evolved to clean 180 square meters or more on a single charge. Furthermore, the service life of the battery with the reduced number of charging times will also be greatly increased, so that the frequency for replacing the battery by the user will also be decreased. More intuitively and importantly, the improvement of the dust removal capacity is the most obvious and important user experience, as the user will directly determine whether the thorough cleaning is achieved. The dry cleaning module may further include a side brush having a rotary shaft, which rotary shaft is angled relative to the ground, for moving debris into a region around the rolling brush of the cleaning module 150.

Figure 5:
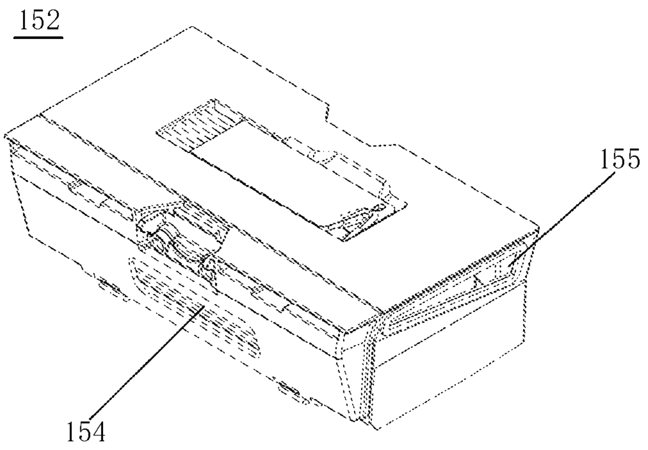
FIG. 5 is an oblique view of a dust box according to an embodiment of the present disclosure.
Figure 6:
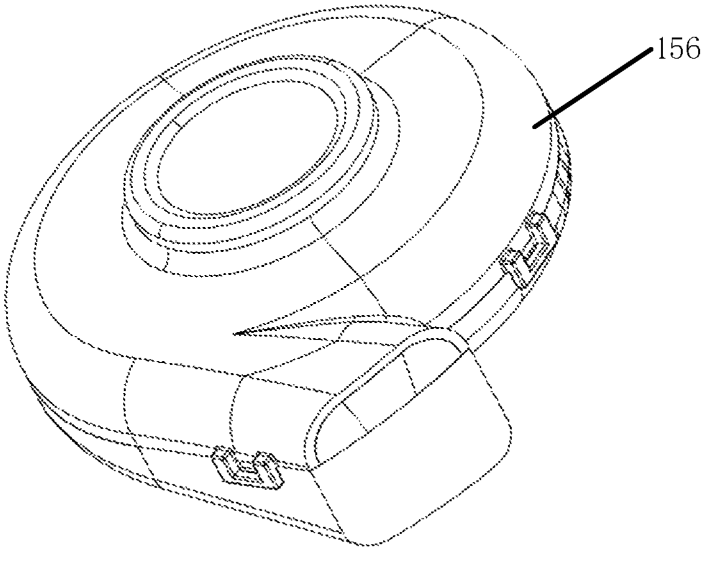
FIG. 6 is an oblique view of a blower according to an embodiment of the present disclosure.
Figure 7:
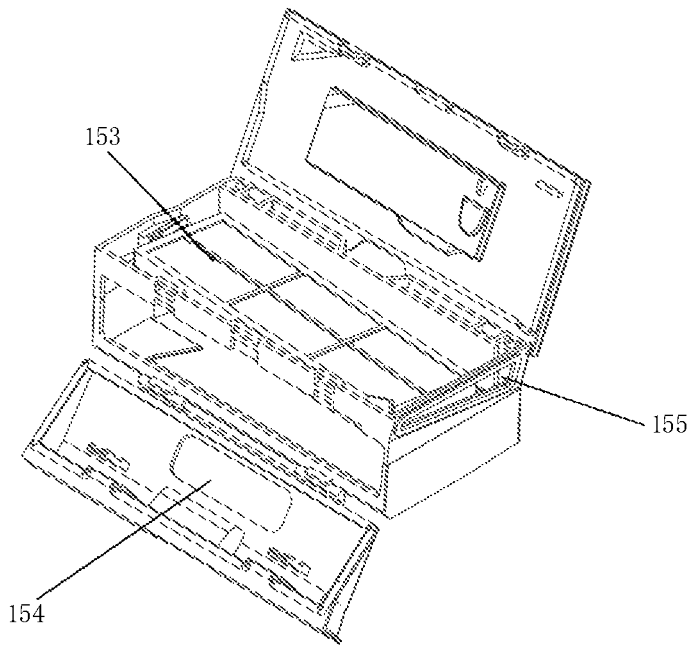
FIG. 7 is a schematic diagram of a dust box in an open state according to an embodiment of the present disclosure.
Figure 8:
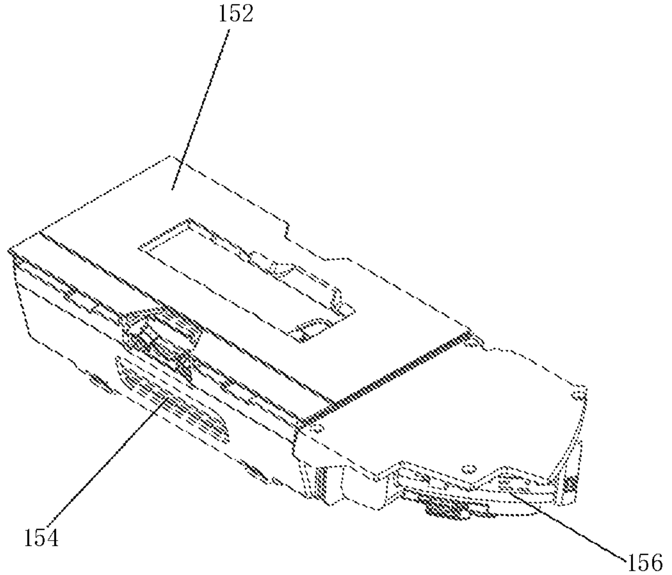
FIG. 8 is a schematic diagram of a dust box and a fan in an assembled state according to an embodiment of the present disclosure.

FIG. 5 is a schematic structural diagram of a dust box 152 in the dry cleaning module, FIG. 6 is a schematic structural diagram of a blower 156 in the dry cleaning module, FIG. 7 is a schematic diagram of the dust box 152 in an open state, and FIG. 8 is a schematic diagram of the dust box and the blower in an assembled state.

The rolling brush having a certain interference with the ground sweeps up garbage on the ground and rolls up the garbage to the front of the dust suction inlet 154 between the rolling brush and the dust box 152. Then, the garbage is sucked into the dust box 152 by air having a suction force, which air is generated by the blower 156 and passes through the dust box 152. The garbage is isolated inside the dust box 152 close to the dust suction inlet 154 by a filter screen 153. The filter screen 153 completely isolates the dust suction inlet from the air outlet, so that the filtered air enters the blower 156 through the air outlet 155.

Typically, the dust suction inlet 154 of the dust box 152 is located in front of the automatic cleaning apparatus, the air outlet 155 is located on a side of the dust box 152, and an air suction inlet of the blower 156 is docked with the air outlet of the dust box.

A front panel of the dust box 152 may be opened for cleaning the garbage in the dust box 152.

The filter screen 153 is detachably connected to a body of the dust box 152 to facilitate assembling, disassembling, and cleaning the filter screen.

Figure 9:
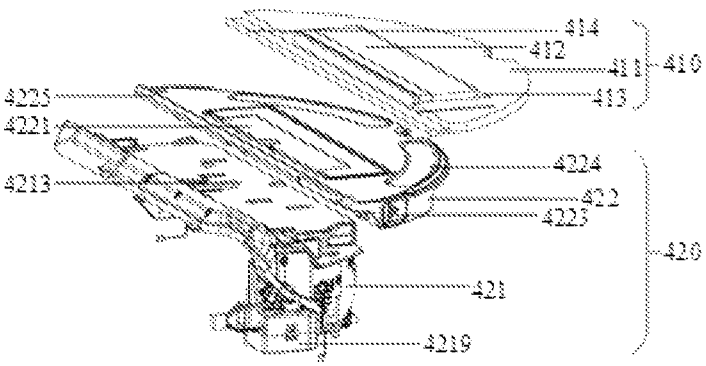
FIG. 9 is an exploded view of an automatic cleaning apparatus according to an embodiment of the present disclosure.
Figure 10:
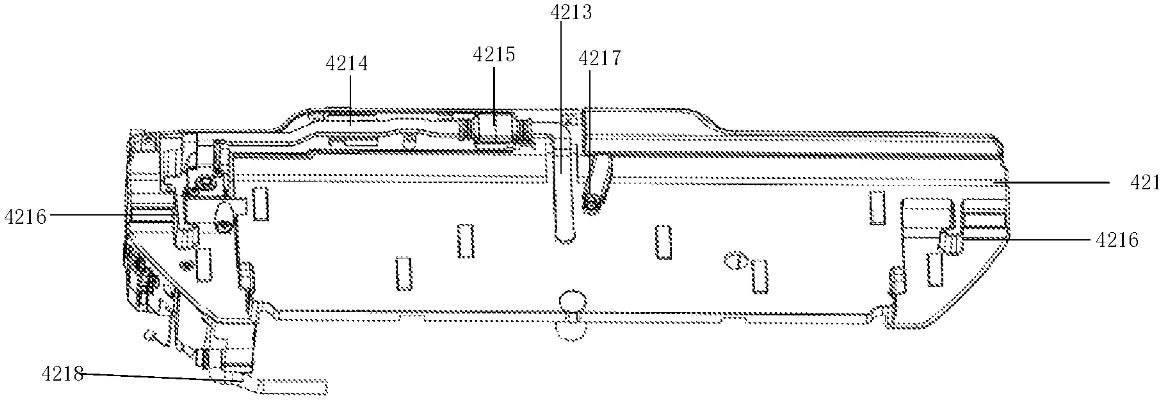
FIG. 10 is a structural diagram of a support platform of an automatic cleaning apparatus according to an embodiment of the present disclosure.
Figure 11:
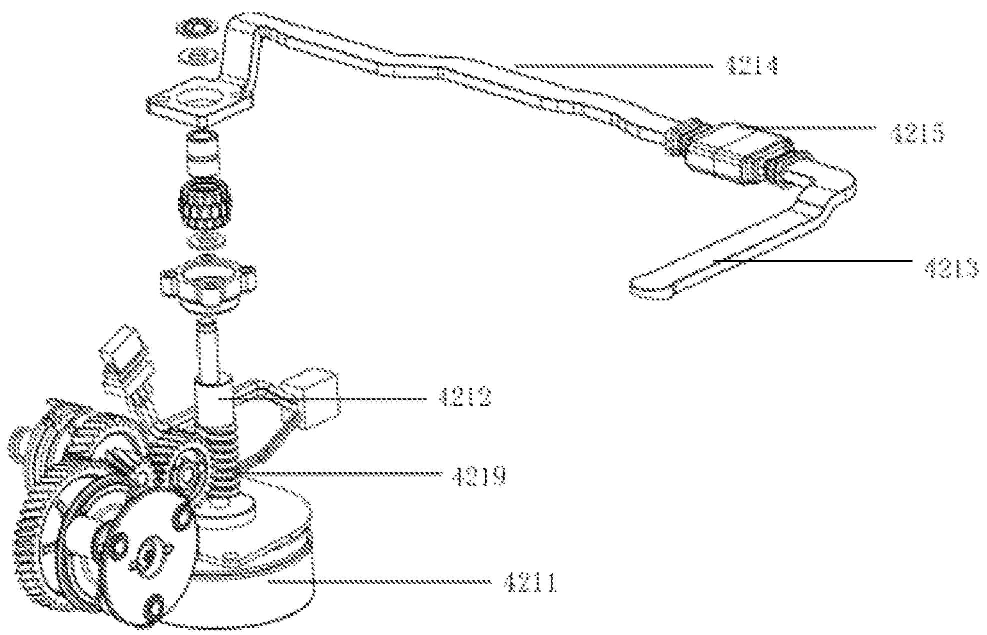
FIG. 11 is a structural diagram of a vibration member of an automatic cleaning apparatus according to an embodiment of the present disclosure.

As shown in FIGS. 9-11, the wet cleaning module 400 according to the present disclosure is configured to clean at least a part of the operation surface by means of wet cleaning. The wet cleaning module 400 includes a cleaning head 410 and a driving unit 420. The cleaning head 410 is used for cleaning at least a part of the operation surface. The driving unit 420 is used for driving the cleaning head 410 to substantially reciprocate along a target surface, the target surface being a part of the operation surface. The cleaning head 410 reciprocates along a surface to be cleaned, and a surface of the cleaning head 410 in contact with the surface to be cleaned is provided with a cleaning cloth or a cleaning plate, which generates a high-frequency friction with the surface to be cleaned through the reciprocating motion, thereby removing stains from the surface to be cleaned. The reciprocating motion may be a reciprocating motion in any one or more directions on the operation surface, or may be vibrations perpendicular to the operation surface, which is not strictly limited herein.

As shown in FIG. 9, the driving unit 420 includes: a driving platform 421, connected to a bottom surface of the mobile platform 100 and used for providing a driving force; and a support platform 422, detachably connected to the driving platform 421, for supporting the cleaning head 410 and configured to lift and lower under the driving by the driving platform 421.

A lifting and lowering module is provided between the cleaning module 150 and the mobile platform 100, so that the cleaning module 150 may be in better contact with the surface to be cleaned, or different cleaning strategies may be used for surfaces to be cleaned made of different materials.

The dry cleaning module 151 may be connected to the mobile platform 100 by a passive lifting and lowering module. When the cleaning apparatus encounters an obstacle, the dry cleaning module 151 may cross over the obstacle more easily with the help of the lifting and lowering module.

The wet cleaning module 400 may be connected to the mobile platform 100 by an active lifting and lowering module. When the wet cleaning module 400 does not participate in the operation temporarily, or when a surface to be cleaned cannot be cleaned by the wet cleaning module 400, the wet cleaning module 400 is lifted by the active lifting and lowering module and separated from the surface to be cleaned, so as to change the cleaning means.

As shown in FIGS. 10-11, the driving platform 421 includes: a motor 4211, disposed on a side of the driving platform 421 close to the mobile platform 100 and used for outputting power through a motor output shaft; a driving wheel 4212, connected to the motor output shaft and having an asymmetric structure; and a vibration member 4213, disposed on a side of the driving platform 421 opposite to the motor 4211 and connected to the driving wheel 4212 to reciprocate under the asymmetrical rotation of the driving wheel 4212.

The driving platform 421 may further include a driving wheel and a gear mechanism. The gear mechanism 235 may connect the motor 4211 and the driving wheel 4212. The motor 4211 may directly drive the driving wheel 4212 to swivel, or may indirectly drive the driving wheel 4212 to swivel through the gear mechanism. Those of ordinary skills in the art may understand that the gear mechanism may be one gear, or may be a gear set composed of a plurality of gears.

The motor 4211 simultaneously transmits, through a power transmission device, power to the cleaning head 410, the driving platform 421, the support platform 422, a water delivery mechanism, a water tank, and the like. The energy system 160 provides power and energy for the motor 4211, and is entirely controlled by the control system 130. The power transmission device may be a gear drive, a chain drive, a belt drive, or may be a worm gear, or the like.

The motor 4211 has a forward output mode and a reverse output mode. In the forward output mode, the motor 4211 rotates in the forward direction. In the reverse output mode, the motor 4211 rotates in the reverse direction. In the forward output mode of the motor 4211, the motor 4211 simultaneously drives, through the power transmission device, the cleaning head 410 in the wet cleaning assembly 400 and the water delivery mechanism to move synchronously.

Further, the driving platform 421 further includes a connection rod 4214. The connection rod 4214 extends along an edge of the driving platform 421 and connects the driving wheel 4212 and the vibration member 4213, so that the vibration member 4213 extends to a preset position. An extension direction of the vibration member 4213 is perpendicular to the connection rod 4214.

The motor 4211 is connected to the driving wheel 4212, the vibration member 4213, the connection rod 4214 and a vibration buffer device 4215 through the power transmission device. When the wet cleaning assembly 400 is activated, the motor 4211 is started to rotate forward and drive the connection rod 4214 through the driving wheel 4212 to reciprocate along the surface of the driving platform 421. In the meanwhile, the vibration buffer device 4215 drives the vibration member 4213 to reciprocate along the surface of the driving platform 421. The vibration member 4213 drives a cleaning substrate 4221 to reciprocate along the surface of the support platform 422. The cleaning substrate 4221 drives a movable region 412 to reciprocate along the surface to be cleaned. At this time, a clean water pump enables clean water to flow out of a clean water tank and sprinkles the clean water on the cleaning head 410 through a water discharge device 4217, and the cleaning head 410 reciprocates to clean the surface to be cleaned.

The cleaning intensity or efficiency of the automatic cleaning apparatus may also be automatically and dynamically adjusted according to an operation environment of the automatic cleaning apparatus. For example, the automatic cleaning apparatus may achieve dynamic adjustment according to physical information of the surface to be cleaned detected by the sensing system 120. For example, the sensing system 120 may detect the flatness of the surface to be cleaned, the material of the surface to be cleaned, the existence of oil and dust, and other information, and transmit the information to the control system 130 of the automatic cleaning apparatus. Accordingly, the control system 130 may instruct the automatic cleaning apparatus to automatically and dynamically adjust a rotational speed of the motor and a transmission ratio of the power transmission device according to the operation environment of the automatic cleaning apparatus, and thus a preset reciprocating period of the reciprocating motion of the cleaning head 410 is adjusted.

For example, when the automatic cleaning apparatus operates on a flat ground, the preset reciprocating period may be automatically and dynamically adjusted to be longer, and a water volume of the water pump may be automatically and dynamically adjusted to be smaller. When the automatic cleaning apparatus operates on a less flat ground, the preset reciprocating period may be automatically and dynamically adjusted to be shorter, and the water volume of the water pump may be automatically and dynamically adjusted to be larger. This is because the flat ground is easier to be cleaned than the less flat ground. Thus, the reciprocating motion of the cleaning head 410 at a higher speed (i.e., a higher frequency) and a larger water volume are needed for cleaning an uneven ground.

For another example, when the automatic cleaning apparatus operates on a table, the preset reciprocating period may be automatically and dynamically adjusted to be longer, and the water volume of the water pump may be automatically and dynamically adjusted to be smaller. When the automatic cleaning apparatus 100 operates on a ground, the preset reciprocating period may be automatically and dynamically adjusted to be shorter, and the water volume of the water pump may be automatically and dynamically adjusted to be larger. This is because the table has less dust and oil compared to the ground, and the material of the table is also easier to clean. Thus, the table can be cleaned with the fewer number of reciprocating motions of the cleaning head 410 and the relatively smaller water volume of the water pump.

The support platform 422 includes a cleaning substrate 4221 which is movably disposed on the support platform 422 and reciprocates under the vibration of the vibration member 4213. Optionally, the cleaning substrate 4221 includes an assembly notch (not shown) disposed at a position in contact with the vibration member 4213. When the support platform 422 is connected to the driving platform 421, the vibration member 4213 is assembled to the assembly notch, so that the cleaning substrate 4221 may reciprocate synchronously along with the vibration member 4213.

Figure 12:
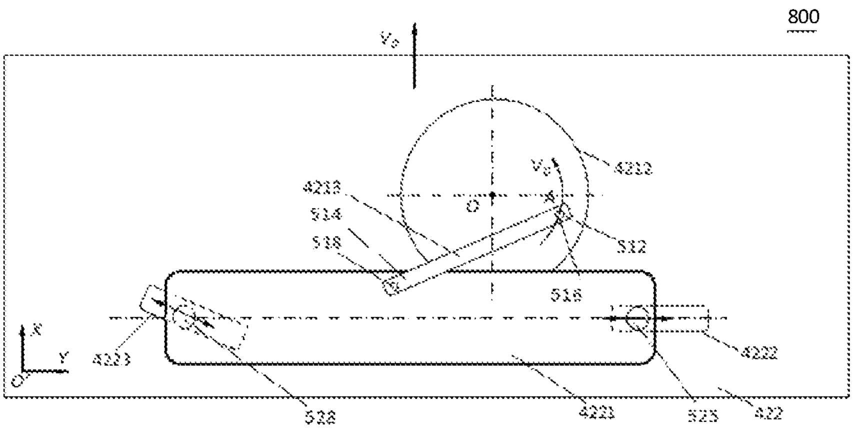
FIG. 12 is a schematic diagram of a cleaning head driving mechanism based on a crank slider mechanism according to another embodiment of the present disclosure.

FIG. 12 shows another cleaning head driving mechanism 800 based on a crank slider mechanism according to a plurality of embodiments of the present disclosure. The driving mechanism 800 may be applied to the driving platform 421. The driving mechanism 800 includes a driving wheel 4212, a vibration member 4213, a cleaning substrate 4221, a sliding slot 4222 (a first sliding slot), and a sliding slot 4223 (a second sliding slot).

The sliding slots 4222 and 4223 are formed in the support platform 422. Two ends of the cleaning substrate 4221 include a slider 525 (a first slider) and a slider 528 (a second slider), respectively. Each of the sliders 525 and 528 is a protrusion at a respective one of two ends of the cleaning substrate 4221. The slider 525 is inserted into the sliding slot 4222 and may slide along the sliding slot 4222. The slider 528 is inserted into the sliding slot 4223 and may slide along the sliding slot 4223. In some embodiments, the sliding slot 4222 and the sliding slot 4223 are located on the same line. In some embodiments, the sliding slot 4222 and the sliding slot 4223 are not on the same line. In some embodiments, the sliding slot 4222 and the sliding slot 4223 extend along the same direction. In some embodiments, an extension direction of the sliding slot 4222 and an extension direction of the sliding slot 4223 are the same as that of the cleaning substrate 4221. In some embodiments, the extension direction of the sliding slot 4222 and the extension direction of the sliding slot 4223 are different from that of the cleaning substrate 4221. In some embodiments, the extension direction of the sliding slot 4222 is different from that of the sliding slot 4223. For example, as shown in FIG. 12, the extension direction of the sliding slot 4222 is the same as that of the cleaning substrate 4221, and the extension direction of the sliding slot 4223 is at a certain angle with relative to that of the sliding slot 4222.

The vibration member 4213 includes a swiveling end 512 and a sliding end 514. The swiveling end 512 is connected to the driving wheel 4212 through a first pivot 516, and the sliding end 514 is connected to the cleaning substrate 4221 through a second pivot 518.

A swiveling center of the driving wheel 4212 is a point O, and a pivoting center of the first pivot 516 is a point A. The point O and the point A do not coincide, and a distance between the point O and the point A is a preset distance d.

When the driving wheel 4212 rotates, the point A also swivels along a circular path. Accordingly, the swiveling end 512 follows the point A to swivel along the circular path, and the sliding end 514 drives the cleaning substrate 4221 to slide through the second pivot 518. Accordingly, the slider 525 of the cleaning substrate 4221 linearly reciprocates along the sliding slot 4222, and the slider 528 linearly reciprocates along the sliding slot 4223. In FIG. 4, a moving speed of the mobile platform 100 is V0, and a moving direction thereof is a target direction. According to some embodiments, when the sliding slot 4223 and the sliding slot 4222 are approximately perpendicular to the direction of the moving speed V0 of the mobile platform 100 respectively, an overall displacement of the cleaning substrate 4221 is substantially perpendicular to the target direction. According to some other embodiments, when any one of the sliding slot 4223 and the sliding slot 4222 forms an angle other than 90 degrees with relative to the target direction, the overall displacement of the cleaning substrate 4221 includes both a component perpendicular to the target direction and a component parallel to the target direction.

Further, a vibration buffer device 4215 is included, which is disposed on the connection rod 4214 and used for reducing vibration in a specific direction. In this embodiment, the vibration buffer device 4215 is used for reducing the vibration in a direction of a movement component perpendicular to the target direction of the automatic cleaning apparatus.

Figure 13:
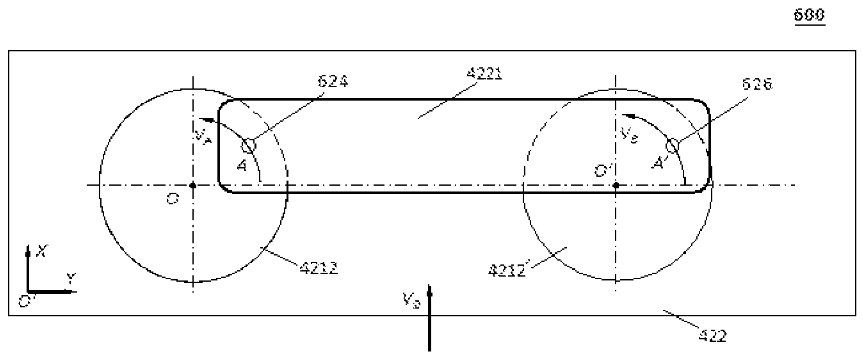
FIG. 13 is a schematic diagram of a cleaning head driving mechanism based on a double-crank mechanism according to another embodiment of the present disclosure.

FIG. 13 shows another cleaning head driving mechanism 600 based on a double-crank mechanism according to a plurality of embodiments of the present disclosure. The driving mechanism 600 may be applied to the driving platform 421. The driving mechanism 600 includes a driving wheel 4212 (a first driving wheel), a driving wheel 4212' (a second driving wheel), and a cleaning substrate 4221.

The cleaning substrate 4221 has two ends, a first end thereof is connected to the driving wheel 4212 through a pivot 624 (a first pivot), and a second end thereof is connected to the driving wheel 4212' through a pivot 626 (a second pivot). A swiveling center of the driving wheel 4212 is a point O, and a pivoting center of the pivot 624 is a point A. The point O and the point A do not coincide, and a distance between the point O and the point A is a preset distance d. A swiveling center of the driving wheel 236 is a point O', and a pivoting center of the pivot 626 is point A'. The point O' and the point A' do not coincide, and a distance between the point O' and the point A' is a preset distance d. In some embodiments, the point A, the point A', the point O, and the point O' are located on the same plane. Therefore, the driving wheel 4212, the driving wheel 4212', and the cleaning substrate 4221 may form a double-crank mechanism (or a parallelogram mechanism), where the cleaning substrate 4221 acts as a coupling lever, and the driving wheels 4212 and 4212' act as two cranks.

Further, a vibration buffer device 4215 is included, which is disposed on the connection rod 4214 and used for reducing vibration in a specific direction. In this embodiment, the vibration buffer device 4215 is used for reducing the vibration in a direction of a movement component perpendicular to the target direction of the automatic cleaning apparatus.

Figure 14:
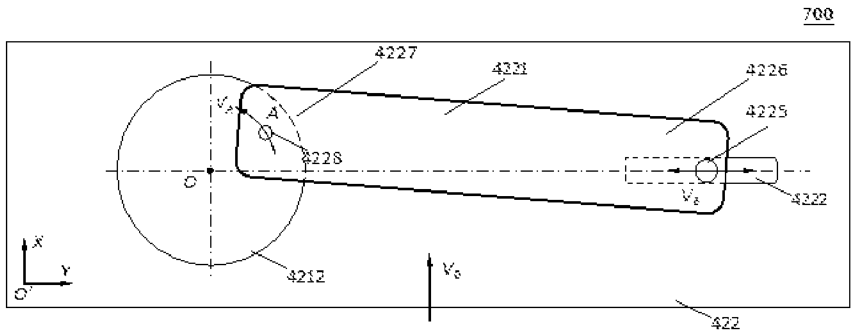
FIG. 14 is a schematic diagram of a cleaning head driving mechanism based on a crank mechanism according to another embodiment of the present disclosure.

FIG. 14 shows a driving mechanism 700 based on a crank slider mechanism according to a plurality of embodiments of the present disclosure. The driving mechanism 700 may be applied to the driving platform 421. The driving mechanism 700 includes a driving wheel 4212, a cleaning substrate 4221, and a sliding slot 4222.

The sliding slot 4222 is formed in the support platform 422. The cleaning substrate 4221 includes a swiveling end 4227 and a sliding end 4226. The swiveling end 4227 is connected to the driving wheel 4212 through a pivot 4228. A swiveling center of the driving wheel 4212 is a point O, and a pivoting center of the pivot 4228 of the swiveling end is a point A. The point O and the point A do not coincide, and a distance between the point O and the point A is a preset distance d. The sliding end 4226 includes a slider 4225. The slider 4225 is a protrusion on the sliding end 4226. The slider 4225 is inserted into the sliding slot 4222 and may slide along the sliding slot 4222. Therefore, the driving wheel 4212, the cleaning substrate 4221, the slider 4225, and the sliding slot 4222 constitute the crank slider mechanism.

When the driving wheel 4212 rotates, the point A swivels along a circular path. Accordingly, the swiveling end 4227 of the cleaning substrate 4221 follows the point A to swivel along the circular path. The slider 4225 also slides in the sliding slot 4222 and reciprocates linearly. As a result, the cleaning substrate 4221 starts to reciprocate. According to some embodiments, the sliding slot 4222 is approximately perpendicular to a direction of the target direction of the moving speed of the mobile platform. Therefore, the linear motion of the sliding end 4226 includes a component perpendicular to the target direction, and the circular swiveling motion of the swiveling end 4227 includes both a component perpendicular to the target direction and a component parallel to the target direction.

In FIG. 14, a moving speed of the mobile platform is V0, and a moving direction thereof is a target direction, and the sliding slot 4222 is approximately perpendicular to the target direction. At this time, the reciprocating motion of the cleaning substrate 4221 as a whole includes both a movement component parallel to the target direction of the automatic cleaning apparatus and a movement component perpendicular to the target direction of the automatic cleaning apparatus.

Further, a vibration buffer device 4215 is included, which is disposed on the connection rod 4214 for reducing vibration in a specific direction. In this embodiment, the vibration buffer device 4215 is used for reducing the vibration in a direction of a movement component perpendicular to the target direction of the automatic cleaning apparatus.

Further, the support platform 422 further includes an elastic detaching button 4229, disposed on at least one side of the support platform 422 and used for detachably connecting the support platform 422 to pawls 4216 of the driving platform 421. At least one assembly region 4224 is disposed on the support platform 422 and used for assembling the cleaning head 410. The assembly region 4224 may be formed of an adhesive material with an adhesive layer.

As shown in FIG. 9, the cleaning head 410 includes a movable region 412, which is connected to the cleaning substrate 4221 to reciprocate along the surface to be cleaned under the driving by the cleaning substrate 4221. The movable region 412 is disposed at a substantially central position of the cleaning head 410. An adhesive layer is provided on a side of the movable region 412 connected to the cleaning substrate 4221. The movable region 412 is connected to the cleaning substrate 4221 through the adhesive layer.

Optionally, the cleaning head 410 further includes a fixed region 411, which is connected to a bottom of the support platform 422 through the at least one assembly region 4224.

The fixed region 411 cleans at least a part of the operation surface along with the movement of the support platform 422.

Further, the cleaning head 410 further includes a flexible connection portion 413, disposed between the fixed region 411 and the movable region 412, and used for connecting the fixed region 411 and the movable region 412. The cleaning head 410 further includes a sliding fastener 414. The sliding fastener 414 extends along an edge of the cleaning head 410, and is detachably mounted at an engagement position 4225 of the support platform 422.

As shown in FIG. 9, the cleaning head 410 may be made of a material with certain elasticity, and is fixed to the surface of the support platform 422 through the adhesive layer so as to reciprocate. The cleaning head 410 is always in contact with the surface to be cleaned during operation.

The water delivery mechanism includes a water discharge device 4217 that may be directly or indirectly connected to a cleaning liquid outlet of a water tank (not shown), that is, a liquid outlet of the clean water tank. The cleaning liquid may flow to the water discharge device 4217 via the cleaning liquid outlet of the water tank, and may be evenly coated on the surface to be cleaned through the water discharge device. A connection member (not shown) may be provided on the water discharge device, and the water discharge device is connected to the cleaning liquid outlet of the water tank through the connection member. The water discharge device is provided with a distribution port, which may be a continuous opening or a combination of several discontinuous small openings. Several nozzles may be provided at the distribution port. The cleaning liquid flows to the distribution port via the cleaning liquid outlet of the water tank and the connection member of the water discharge device, and is evenly coated on the operation surface via the distribution port.

The water delivery mechanism may further include a clean water pump 4219 and/or a clean water pump pipe 4218. The clean water pump 4219 may be in communication with the cleaning liquid outlet of the water tank directly, or in communication with the cleaning liquid outlet of the water tank through the clean water pump pipe 4218.

The clean water pump 4219 may be connected to the connection member of the water discharge device, and configured to pump the cleaning liquid from the water tank to the water discharge device. The clean water pump may be a gear pump, a vane pump, a plunger pump, a peristaltic pump, or the like.

The water delivery mechanism draws the cleaning liquid out of the clean water tank through the clean water pump 4219 and the clean water pump pipe 4218, and transports the cleaning liquid to the water discharge device. The water discharge device 4217 may be a spray head, a drip hole, a wet cloth, or the like, and may uniformly spread water on the cleaning head so as to wet the cleaning head and the surface to be cleaned. Stains on the wetted surface to be cleaned can be cleaned more easily. In the wet cleaning assembly 400, the power or flow rate of the clean water pump may be adjusted.

By adding the driving unit and the vibration region to the wet cleaning module as described above, the cleaning head may reciprocate to repeatedly clean the surface to be cleaned. Therefore, in a movement trajectory of a cleaning robot, a region may be cleaned several times by the cleaning robot passing the region just one time, thereby greatly enhancing the cleaning effect. The cleaning effect is obvious especially for a region with more stains.

Figure 15:
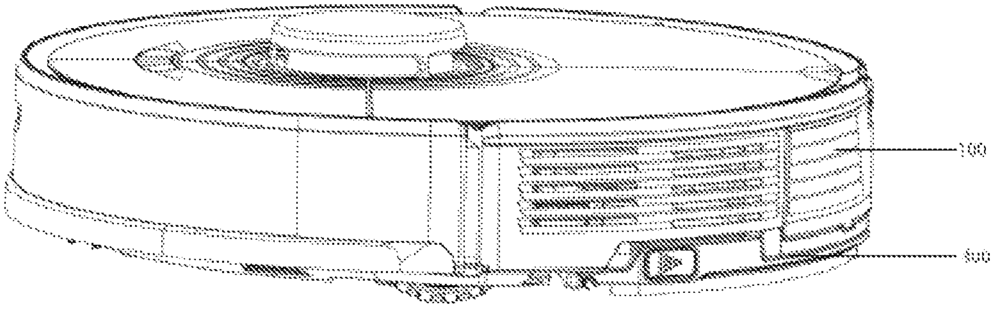
FIG. 15 is a schematic diagram of an automatic cleaning apparatus in a lifted state according to an embodiment of the present disclosure.
Figure 16:
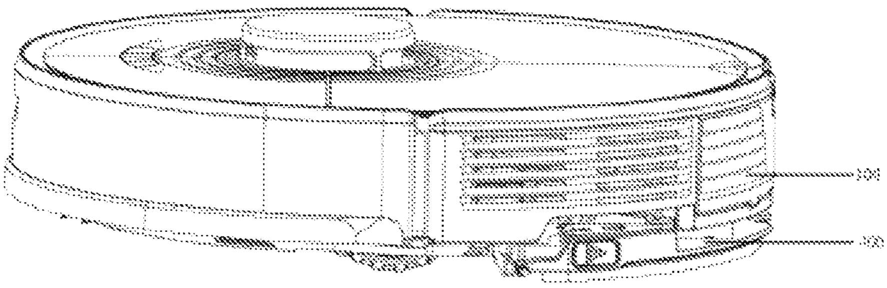
FIG. 16 is a schematic diagram of an automatic cleaning apparatus in a lowered state according to an embodiment of the present disclosure.

According to a specific embodiment of the present disclosure, the present disclosure provides a liftable automatic cleaning apparatus, including: a mobile platform 100, configured to automatically move on an operation surface; and a wet cleaning module 400, movably connected to the mobile platform 100 through a four-linkage lifting and lowering structure 500, and configured to clean at least a part of the operation surface by means of wet cleaning. The four-linkage lifting and lowering structure 500 is a parallelogram structure for switching the wet cleaning module 400 between a lifted state and a lowered state. In the lifted state, the wet cleaning module 400 escapes from the operation surface, as shown in FIG. 15. In the lowered state, the wet cleaning module 400 is attached to the operation surface, as shown in FIG. 16.

Figure 17:
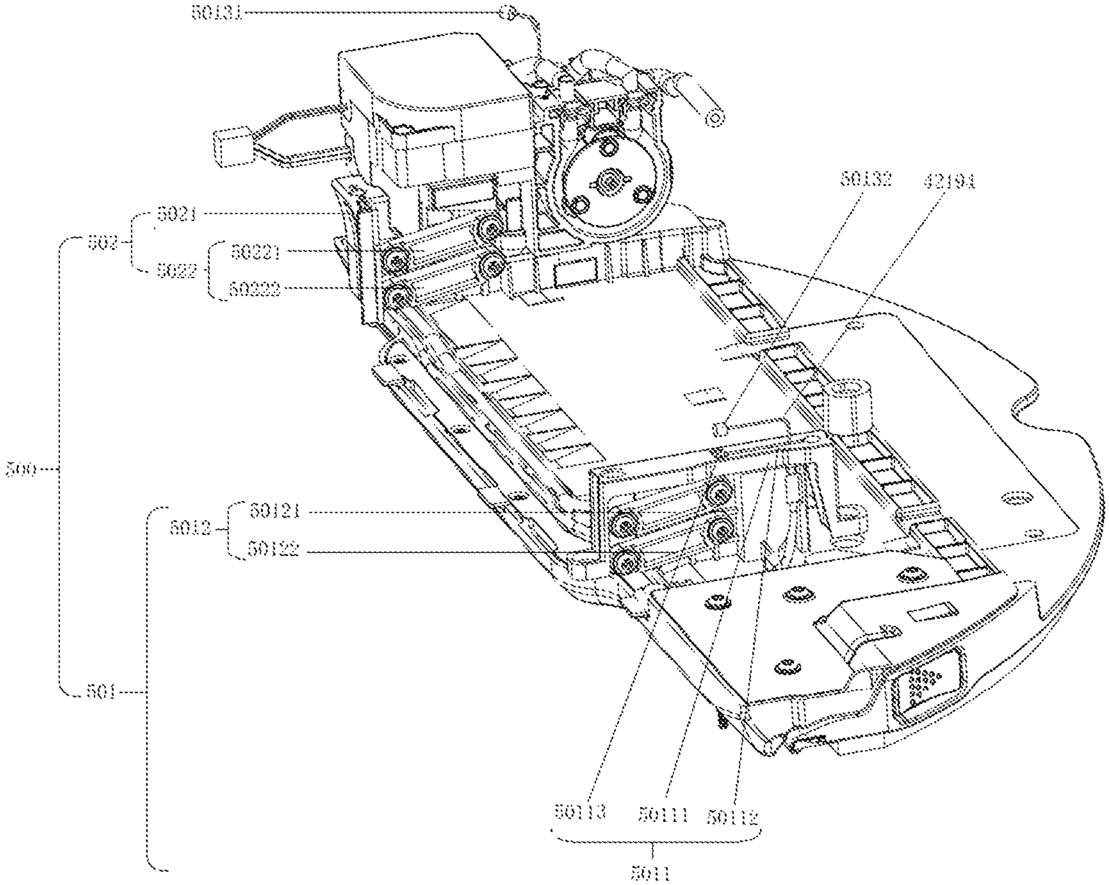
FIG. 17 is a schematic diagram of a four-linkage lifting and lowering structure in a lifted state according to an embodiment of the present disclosure.
Figure 18:
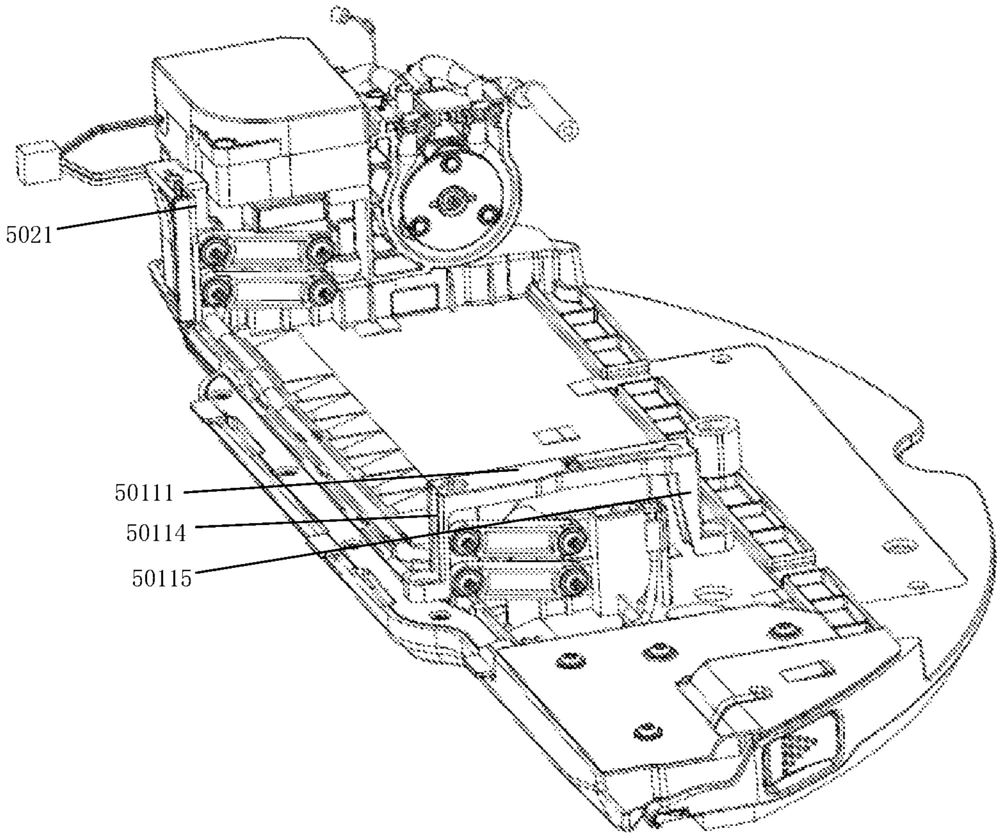
FIG. 18 is a schematic diagram of a four-linkage lifting and lowering structure in a lowered state according to an embodiment of the present disclosure.

As shown in FIGS. 17-18, the four-linkage lifting and lowering structure 500 includes: a first connection end 501, for providing active power to switch the wet cleaning module 400 between the lifted state and the lowered state; and a second connection end 502, disposed opposite to the first connection end 501 and configured to rotate under the action of the active power. The first connection end 501 and the second connection end 502 are located on two sides of the wet cleaning module 400 respectively, to lift or lower the wet cleaning module 400 by stably providing a lifting or lowering force.

Specifically, the first connection end 501 includes a first bracket 5011 fixedly connected to the bottom of the mobile platform 100. The first bracket 5011 is roughly shaped like a Chinese character "儿", and includes a cross beam 50111, a first longitudinal beam 50114, and a second longitudinal beam 50115. A tail end of each of the first longitudinal beam 50114 and the second longitudinal beam 50115 is fixedly connected to the mobile platform 100 and the wet cleaning module 400 through bolts, so as to provide a supporting force when the wet cleaning module 400 is lifted or lowered.

The first connection end 501 further includes a first connection rod pair 5012, one end of which is rotatably connected to the first bracket 5011, and the other end of which is rotatably connected to the wet cleaning module 400. The first connection rod pair 5012 may be a hollowed-out structure, which helps to reduce an overall weight of the lifting and lowering ends.

Optionally, the first connection rod pair 5012 includes a first connection rod 50121 and a second connection rod 50122 which are arranged in parallel. A first end of each of the first connection rod 50121 and the second connection rod 50122 is rotatably connected to the first longitudinal beam 50114 through a movable stud. A second end of each of the first connection rod 50121 and the second connection rod 50122 is rotatably connected to the wet cleaning module 400 through a movable stud. For example, both ends of each of the first connection rod 50121 and the second connection rod 50122 are provided with a through hole having a diameter greater than that of the movable stud, respectively. Thus, the movable stud may rotate freely within the through hole, and is fixedly connected to the first longitudinal beam 50114 after passing through the through hole. When the motor 50131 provides a pulling force to the second ends through the cable, the first ends of the first connection rod 50121 and the second connection rod 50122 simultaneously rotate around the movable studs at the first ends, and the second ends thereof are lifted under the pulling force of the cable, so that the wet cleaning module 400 is lifted. When the motor 4211 releases the pulling force to the second ends through the cable, the first ends of the first connection rod 50121 and the second connection rod 50122 simultaneously rotate reversely around the movable studs at the first ends, and the second ends thereof are lowered under the action of gravity, so that the wet cleaning module 400 is lowered.

The lifting and lowering structure 500 further includes a cable 42194, for providing a pulling force to rotate the first connection rod pair 5012 within a preset angle. The cable 42194 includes a cable motor terminal 50131 and a cable bracket terminal 50132.

The cable motor terminal 50131 is connected to the driving unit 420. For example, the cable motor terminal 50131 is wound on the gear connected to the motor output shaft, so as to extend and retract under the rotation of the motor. The cable bracket terminal 50132 is connected to the first bracket 5011. The motor lifts or lowers the second ends of the first connection rod 50121 and the second connection rod 50122 through the cable 42194.

Optionally, the first bracket 5011 further includes: a sliding slot 50112, extending along a surface of the cross beam 50111; and a snapping hole 50113, running through the cross beam 50111 and formed in an extension end of the sliding slot 50112, for accommodating and snapping the cable bracket terminal 50132. The cable 42194 is connected to the second ends of the first connection rod 50121 and the second connection rod 50122 through the sliding slot 50112 and the snapping hole 50113. The sliding slot 50112 can restrict a moving direction of the cable to ensure the stability of the lifting and lowering module. The width of the sliding slot should match the thickness of the cable.

As shown in FIG. 17, the second connection end 502 includes: a second bracket 5021, fixedly connected to the bottom of the mobile platform 100; and a second connection rod pair 5022, one end of which is rotatably connected to the second bracket 5021, and the other end of which is rotatably connected to the wet cleaning module 400. The second connection rod pair 5022 rotates along with the rotation of the first connection rod pair 5012. The second connection rod pair 5022 may be a hollowed-out structure, which helps to reduce the overall weight of the lifting and lowering ends.

Specifically, the second connection rod pair 5022 includes a third connection rod 50221 and a fourth connection rod 50222 which are arranged in parallel. A first end of each of the third connection rod 50221 and the fourth connection rod 50222 is rotatably connected to the second bracket 5021 through a movable stud. A second end of each of the third connection rod 50221 and the fourth connection rod 50222 is rotatably connected to the wet cleaning module 400 through a movable stud. For example, both ends of each of the third connection rod 50221 and the fourth connection rod 50222 are provided with a through hole having a diameter greater than that of the movable stud, respectively. Thus, the movable stud may rotate freely within the through hole, and is fixedly connected to the second bracket 5021 through the through hole. When the first connection end 501 rotates under the driving by the motor 50131, the first ends of the third connection rod 50221 and the fourth connection rod 50222 simultaneously rotate around the movable studs at the first ends, and the second ends of the third connection rod 50221 and the fourth connection rod 50222 simultaneously rotate around the movable studs at the second ends, so that the wet cleaning module 400 is lifted. When the pulling force is released to the first connection end 501, the first ends of the third connection rod 50221 and the fourth connection rod 50222 simultaneously rotate reversely around the movable studs at the first ends, and the second ends thereof are lowered under the action of gravity, so that the wet cleaning module 400 is lowered.

Through the four-linkage lifting and lowering structure disposed between the wet cleaning module and the mobile platform, the wet cleaning module may be lifted and lowered relative to the mobile platform. When a ground mopping task is performed, the wet cleaning module is lowered to enable the wet cleaning module to be in contact with the ground. When the ground mopping task is completed, the wet cleaning module is lifted to separate the wet cleaning module from the ground, thereby avoiding the increased resistance due to the existence of the cleaning module when the cleaning apparatus moves freely on the surface to be cleaned.

In cooperation with a surface medium sensor and other sensors that can detect a surface type of the surface to be cleaned, the lifting and lowering module enables the wet cleaning module to perform the cleaning operation according to different surfaces to be cleaned. For example, the lifting and lowering module lifts the wet cleaning module in case of a carpet surface, and lowers the wet cleaning module in case of a floor surface, a floor tile surface, or the like, for the purpose of cleaning. Thus, a more comprehensive cleaning effect is achieved.

With the development of cleaning robots, existing cleaning robots have been developed into cleaning robots combining dry cleaning and wet cleaning. As shown in FIG. 2, a cleaning robot 2000 is simultaneously installed with a dry cleaning module 151 and a wet cleaning module 400. During cleaning, the dry cleaning module 151 is located at a front end in a traveling direction to clean the ground; and the wet cleaning module 400 is located at a rear end in the traveling direction. After the dry cleaning module 151 completes cleaning, the wet cleaning module 400 may mop and clean the ground. But the wet cleaning module 400 may not usually be used for carpet cleaning.

In practical applications, in order to avoid wetting a carpet by the wet cleaning module 400, a lifting and lowering mechanism for the wet cleaning module is usually disposed on the cleaning robot 2000. When a surface medium sensor 103 of the cleaning robot 2000 identifies the carpet, the wet cleaning module may be lifted. Thus, when the cleaning robot 2000 moves across the carpet, the wet cleaning module will not touch the carpet. When it is detected that the cleaning robot has escaped from the carpet, the wet cleaning module 400 may be lowered again to mop and clean the ground.

However, due to the height limitation of the cleaning robot 2000, the range for lifting and lowering the wet cleaning module 400 is very limited, which is usually only about 1 mm. For carpets with long fluffs, or mats, clothing, or the like, they may be wetted even though the wet cleaning module 400 has been lifted, and also the cleaning robot 2000 may be trapped and unable to move.

In addition, when completing the cleaning task and turning around, the cleaning robot 2000 may easily encounter narrow gaps defined by a plurality of additional obstacles. At this time, the cleaning robot 2000 may get trapped very easily and cannot escape.

In view of above, an exemplary embodiment of the present disclosure provides a cleaning robot escape method, which will be explained now by referring to FIGS. 19 and 20.

Figure 19:
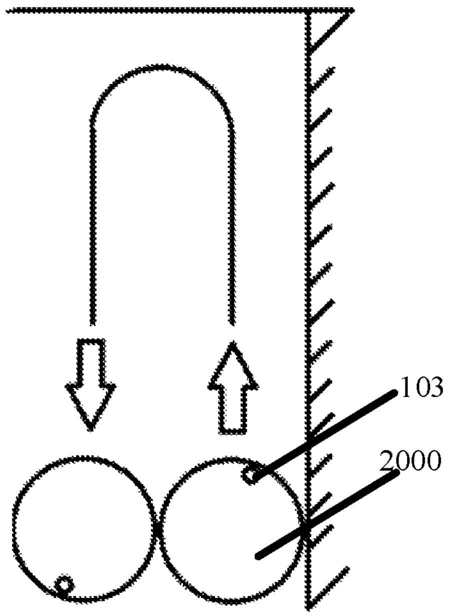
FIG. 19 shows a route map for a cleaning robot when cleaning along a wall as illustrated according to an embodiment of the present disclosure.

As shown in FIG. 19, when cleaning the uncarpeted ground along a wall, or cleaning the ground at a corner far from a carpet, the cleaning robot 2000 may sense a distance between its body and the wall through a side distance sensor, and advance along the edge of the wall while keeping the distance constant between its body and the wall. Further, the cleaning robot 2000 may sweep the dust on the edge of the wall into a main brush on its body through a front side brush 157 of the cleaning robot 2000, and may also choose to mop and clean the ground through the wet cleaning module 400. After completing the task of cleaning along the wall, the cleaning robot 2000 automatically turns around and continues to clean the ground, as shown in FIG. 19.

Figure 20:
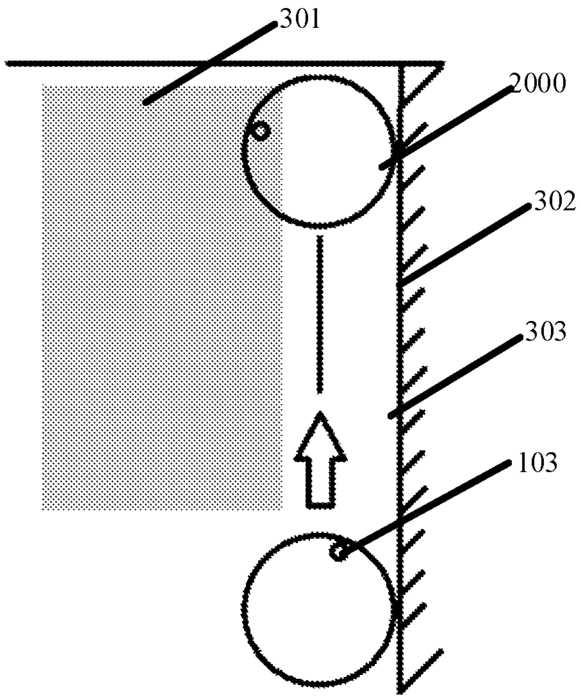
FIG. 20 shows a schematic structural diagram of a cleaning robot when cleaning along a wall and getting trapped as illustrated according to an embodiment of the present disclosure.

However, when the cleaning robot 2000 turns around due to the encounter of an obstacle such as an additional wall while cleaning along the wall, and detects a carpet 301, a narrow gap 303 exists between the carpet 301 and the wall 302, as shown in FIG. 20. Since the surface medium sensor 103 is beside the wall 302 when the cleaning robot 2000 enters the narrow gap 303, that is, the carpet 301 is not detected by the surface medium sensor 103, the surface medium sensor 103 is currently not triggered. When the cleaning robot 2000 turns around and returns after encountering an obstacle or completing the cleaning along the wall, the surface medium sensor 103 is triggered. If the width of the narrow gap 303 is not enough for the cleaning robot 2000 to turn around, the cleaning robot 2000 will get trapped in the narrow gap and cannot come out, causing a trouble to a user.

Figure 21:
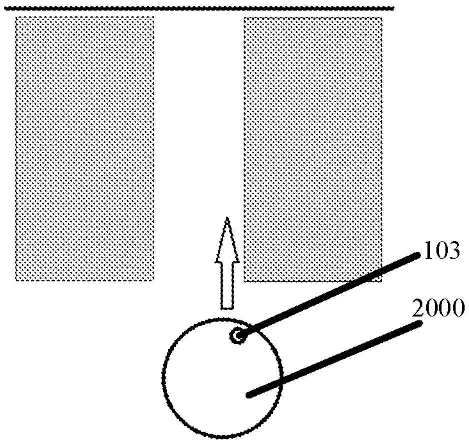
FIG. 21 shows a first schematic route map for a cleaning robot when cleaning along an edge of a carpet as illustrated according to an embodiment of the present disclosure.
Figure 22:
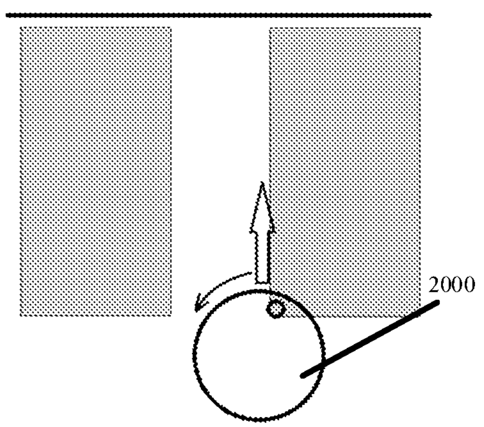
FIG. 22 shows a second schematic route map for a cleaning robot when cleaning along an edge of a carpet as illustrated according to an embodiment of the present disclosure.
Figure 23:
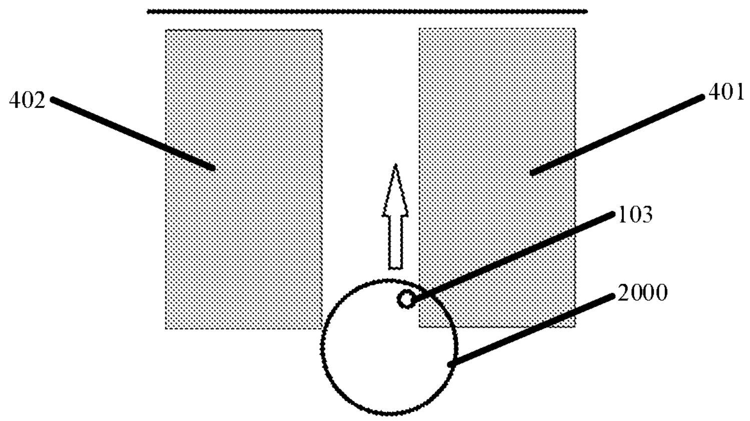
FIG. 23 shows a third schematic route map for a cleaning robot when cleaning along an edge of a carpet as illustrated according to an embodiment of the present disclosure.

In addition, as shown in FIG. 21, if the cleaning robot 2000 detects the carpet before cleaning along the edge of the carpet, the cleaning robot 2000 controls the body to rotate by a certain angle, for example, by 15 degrees counterclockwise as shown in FIG. 22. Moreover, the cleaning robot 2000 advances by a short distance in a direction following this angle. After advancing by the short distance, the cleaning robot 2000 rotates back to the previous angle and continues to advance in the previous direction, while detecting whether the carpet exists. If the carpet may still be detected, the cleaning robot needs to continue to rotate by a certain angle and repeats the above process, until the carpet is not detected, and then a mode for cleaning along the edge of the carpet is activated, as shown in FIG. 23.

In practical applications, the specific direction and angle of rotation, as well as the magnitude of short distance forward, may be set according to the actual situation, which will not be limited in this exemplary embodiment.

Figure 24:
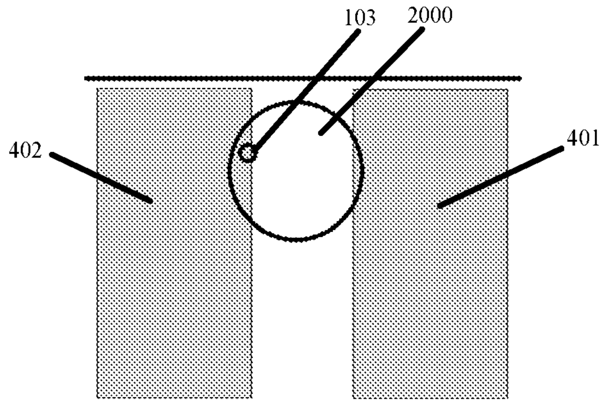
FIG. 24 shows a schematic structural diagram of a cleaning robot when cleaning along an edge of a carpet and getting trapped as illustrated according to an embodiment of the present disclosure.

After the cleaning robot 2000 completes cleaning along the edge of the carpet, for example, as shown in FIG. 24, after the cleaning robot 2000 completes cleaning along the edge of a first carpet 401, the cleaning robot turns around, during which another carpet, i.e., a second carpet 402 in FIG. 24, is likely to be detected. If a gap between the first carpet 401 and the second carpet 402 is narrow, the second carpet 402 is not detected by a carpet identification device 103 since the carpet identification device 103 is located on one side of the first carpet 401 when the cleaning robot 2000 enters the gap. At this time, the carpet identification device 103 is not triggered. When the cleaning robot 2000 turns around and returns after completing the cleaning along the edge of the first carpet 401, the carpet identification device 103 is triggered. If the width of the gap is not enough for the cleaning robot 2000 to turn around, the cleaning robot 2000 will get trapped in the gap and cannot come out, causing a trouble to the user.

Figure 25:
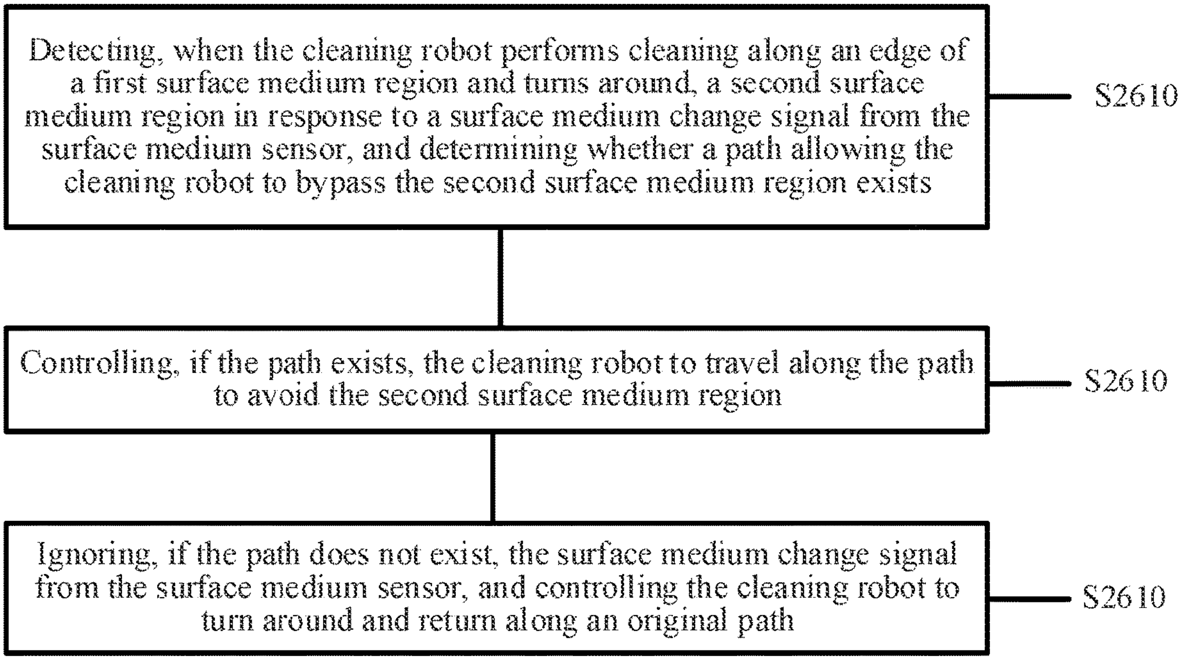
FIG. 25 shows a flowchart of a cleaning robot escape method as illustrated according to an embodiment of the present disclosure.

Under this circumstance, referring to FIG. 25, it shows a flowchart of a cleaning robot escape method provided by an exemplary embodiment of the present disclosure. The cleaning robot escape method may include the following steps.

In S2610, when the cleaning robot performs cleaning along an edge of a first surface medium region and turns around, a second surface medium region is detected in response to a surface medium change signal from the surface medium sensor, and it is determined whether a path allowing the cleaning robot to bypass the second surface medium region exists.

In S2620, if the path exists, the cleaning robot is controlled to travel along the path to avoid the second surface medium region.

In S2630, if the path does not exist, the surface medium change signal from the surface medium sensor is ignored, and the cleaning robot is controlled to turn around and return along an original path.

According to the cleaning robot escape method provided by an exemplary embodiment of the present disclosure, when the cleaning robot encounters an obstacle (such as a wall and carpet) while cleaning along the edge of the first surface medium region, and is ready to turn around, the surface medium sensor is triggered and detects a change in surface medium, thereby identifying the second surface medium region such as the carpet. At this time, it may be determined first whether a path allowing the cleaning robot to bypass the second surface medium region exists, thereby helping the cleaning robot to escape. That is, if the path allowing the cleaning robot to bypass the second surface medium region exists, the cleaning robot is controlled to travel along this path, so as to prevent it from getting trapped by the second surface medium region. However, if the path allowing the cleaning robot to bypass the second surface medium region does not exist, the surface medium change signal from the surface medium sensor may be first ignored, and the cleaning robot is controlled to turn around and return along an original path, thereby enabling the cleaning robot to escape by forcibly controlling the cleaning robot to avoid the second surface medium region.

The cleaning robot escape method provided by an exemplary embodiment of the present disclosure provides a method for enabling the cleaning robot to escape while turning around after completing the cleaning task of a region with a narrow gap between the carpet and the wall or between a first carpet and a second carpet. Thus, the cleaning robot is prevented from getting trapped, thereby improving the ability of automatic escape, reducing a fault rate of the cleaning robot, and thus improving the user experience.

It should be noted that the cleaning robot escape method described above is suitable for the cleaning robot in a mode without cleaning the carpet or a mode with the wet cleaning module being activated. In these two modes, the cleaning robot is not allowed to step on the carpet, i.e., in a mode for only cleaning the first surface medium region. Thus, when encountering a carpet trap, the cleaning robot can be controlled to escape without stepping on the caret by means of the cleaning robot escape method provided by an exemplary embodiment of the present disclosure, so as to reduce the probability that the cleaning robot is trapped by the carpet.

In addition, the first surface medium here is one or more of floor surface media such as wooden floors, carpets, tiles, cement surfaces, or the like; and the second surface medium is one or more of floor surface media such as wooden floors, carpets, tiles, cement surfaces, or the like, and is different from the first surface medium.

In an exemplary embodiment of the present disclosure, when the cleaning robot turns around and detects the second surface medium region, the cleaning robot may be helped in escape by directly determining whether a path allowing the cleaning robot to bypass the second surface medium region exists. A method for determining the path allowing the cleaning robot to bypass the second surface medium region may include: searching in an established room map to determine whether the second surface medium region exists in the room map. If the second surface medium region exists in the room map, it can be determined whether the path allowing the cleaning robot to bypass the second surface medium region exists according to the room map and the boundary of the second surface medium region stored in the room map, thereby helping the cleaning robot to escape. That is, if the path allowing the cleaning robot to bypass the second surface medium region exists, the cleaning robot is controlled to travel along this path, so as to avoid the second surface medium region, and thus the cleaning robot is allowed to enter a normal cleaning mode.

However, if the second surface medium region does not exist in the above room map, a boundary scanning mode of the cleaning robot may be activated to scan the edge of the second surface medium region, and the edge information of the second surface medium region resulting from the scanning result is stored in the room map, so as to provide a reference basis for the next cleaning operation.

However, in practical applications, there is usually a situation where a current room map does not exist in the cleaning robot. For example, the cleaning robot enters a new room, or the cleaning robot has not established a room map. At this time, it is difficult for the cleaning robot to predetermine a path allowing the cleaning robot to bypass the second surface medium region. In this case, the cleaning robot escape method provided by an exemplary embodiment of the present disclosure may control the cleaning robot to turn around and return along the original path by ignoring the surface medium change signal from the surface medium sensor, thereby achieving the escape purpose.

In an exemplary embodiment of the present disclosure, during the process of controlling the cleaning robot to turn around and return along the original path, the surface medium change signal from the surface medium sensor may be continuously monitored to determine whether the surface medium change signal from the surface medium sensor disappears. If the surface medium change signal from the surface medium sensor disappears, the surface medium sensor no longer transmits the surface medium change signal, indicating at this time that the cleaning robot has escaped from the second surface medium region. In this case, the cleaning robot may be controlled to continue advancing by a preset distance. After advancing by the preset distance, the cleaning robot is controlled to stop and rotate a single revolution in situ, so as to determine whether the cleaning robot has escaped from the second surface medium region.

In an exemplary embodiment of the present disclosure, if the surface medium sensor of the cleaning robot triggers the surface medium change signal when the cleaning robot rotates a single revolution, it indicates that the cleaning robot has encountered a new surface medium region, or the cleaning robot has not escaped completely from the second surface medium region. At this time, the cleaning robot may be controlled to continue returning along the original path to achieve the escape purpose.

However, if the surface medium sensor of the cleaning robot does not trigger the surface medium change signal when the cleaning robot rotates a single revolution, it indicates that the cleaning robot has escaped from the second surface medium region, and the cleaning robot is no more hindered by a new surface medium region. At this time, the cleaning robot may be controlled to enter the normal cleaning mode, so as to continue cleaning the first surface medium region.

The existing common surface medium sensors mainly include infrared sensors, ultrasonic sensors, or other different sensor identification devices, and specific methods for detecting whether a surface medium change has occurred at the location of the surface medium sensor of the cleaning robot may be different. In this exemplary embodiment, the method about how the surface medium sensor triggers the surface medium change signal is explained by taking an ultrasonic sensor as an example.

Figure 26:
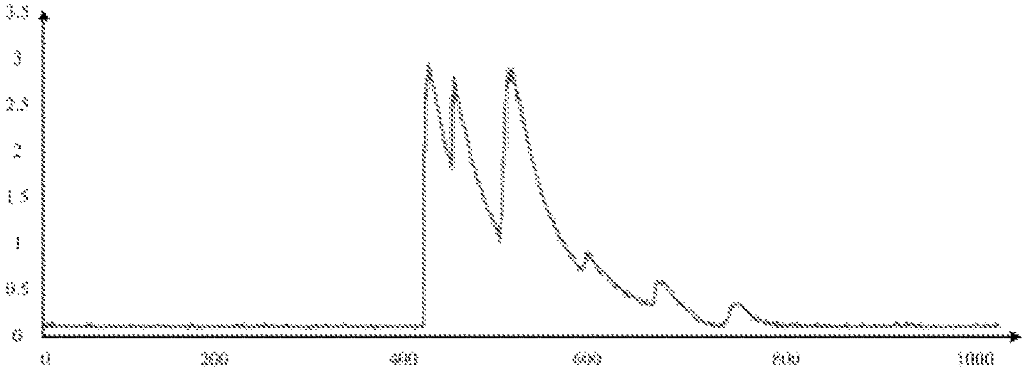
FIG. 26 shows a waveform diagram of an echo received by an ultrasonic sensor from a first surface medium region as illustrated according to an embodiment of the present disclosure.
Figure 27:
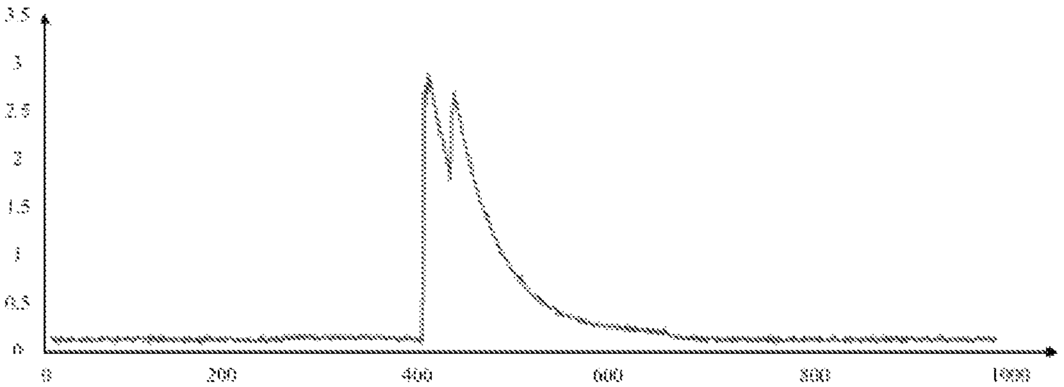
FIG. 27 shows a waveform diagram of an echo received by an ultrasonic sensor from a second surface medium region as illustrated according to an embodiment of the present disclosure.

In practical applications, the ultrasonic sensor is used to transmit an ultrasonic signal to a first surface medium region such as the ground and receive an echo signal reflected by the first surface medium region. A deviation may exist between a waveform of the ultrasonic echo signal from the first surface medium region and a waveform of an ultrasonic echo signal from the surface of the second surface medium region, as shown in FIGS. 26 and 27. Thus, the surface of the first surface medium region and the surface of the second surface medium region may be distinguished according to the difference between the echo signals. The surface of the second surface medium region refers to a surface of a second surface medium region laid on a ground surface. The waveform and number of peaks of the echo signal may be used to characterize the signal.

In an exemplary embodiment of the present disclosure, the process for detecting whether the surface medium sensor of the cleaning robot triggers the surface medium change signal specifically includes: controlling the surface medium sensor to transmit an ultrasonic signal perpendicularly to a current surface, and receiving an actual echo signal reflected by the current surface; and determining whether the actual echo signal is different from an echo signal from the surface of the first surface medium region, and determining, if a difference exists, that the location of the surface medium sensor is already in the second surface medium region, i.e., that the surface medium change has occurred, where at this time, the surface medium change signal is triggered by the surface medium sensor.

In practical applications, after receiving an electrical signal, the ultrasonic sensor converts the electrical signal into an ultrasonic signal and transmits the ultrasonic signal down to the surface of the medium region. The above ultrasonic signal is reflected by the surface of the medium region, and then received and converted into an electrical signal by the ultrasonic sensor. Determining the difference between the actual echo signal and the echo signal from the surface of the first surface medium region may specifically include: determining whether the number of peaks in the actual echo signal is less than the number of peaks in the echo signal from the surface of the first surface medium region, and identifying, if the number of peaks in the actual echo signal is less than the number of peaks in the echo signal from the surface of the first surface medium region, the current ground as the surface of the second surface medium region. Specifically, for different regions, the actual echo signals may be compared separately with the echo signal from the surface of the first surface medium region corresponding to the current region, so as to improve the accuracy in identifying the second surface medium region.

In this exemplary embodiment, the echo signal from the surface of the second surface medium region is determined by taking the echo signal from the surface of the first surface medium region as the basis, so that the difficulty in identifying the second surface medium region can be reduced, and the accuracy and precision in identifying the second surface medium region by the cleaning robot to can be improved.

In an exemplary embodiment of the present disclosure, before the cleaning robot is controlled to return along the original path, it is necessary to first determine whether the cleaning robot has escaped from the second surface medium region. Only when the cleaning robot is determined to have escaped from the second surface medium region, the cleaning robot is controlled to rotate in situ, such that a traveling direction of the cleaning robot is parallel to the edge of the first surface medium region, thereby controlling the cleaning robot to return by following the traveling direction.

During returning, the cleaning robot may be controlled to travel in a forward return manner or in a reverse return manner. In this exemplary embodiment, in order to prevent the cleaning robot from continuing to make a misjudgment and giving an alarm, the reverse return manner is adopted to ensure that the cleaning robot quickly returns to an initial position. The initial position here may be a position from which the cleaning robot begins to perform cleaning along the wall, which will not be limited in this exemplary embodiment.

Whether the cleaning robot has escaped from the second surface medium region is determined mainly according to whether the surface medium sensor of the cleaning robot triggers the surface medium change signal. When the actual echo signal is the same as the echo signal from the surface of the first surface medium region, the cleaning robot is determined to have escaped from the second surface medium region. The details will no longer be repeated here.

In practical applications, the cleaning robot further includes other functions helpful to implement overall operation, and these functions are not described in detail in this exemplary embodiment.

It should be noted that the method described above is applicable to cleaning robots with dry cleaning modules and wet cleaning modules, and ground sweeping robots with only dry cleaning modules, or ground mopping robots with only wet cleaning modules, as well as other intelligent robots having autonomous traveling mechanisms and requiring the identification of ground forms, and these are not limited in the exemplary embodiments of the present disclosure.

It should be noted that, although the steps of the method according to the present disclosure are described in a particular sequence in the drawings, it is not intended to require or imply that these steps must be performed according to this particular sequence, or an expected result can be achieved only after all the steps as shown are executed. Additionally or alternatively, some steps may be omitted, a plurality of steps may be combined into one step to be performed, and/or one step may be broken down into a plurality of steps to be performed.

Figure 28:
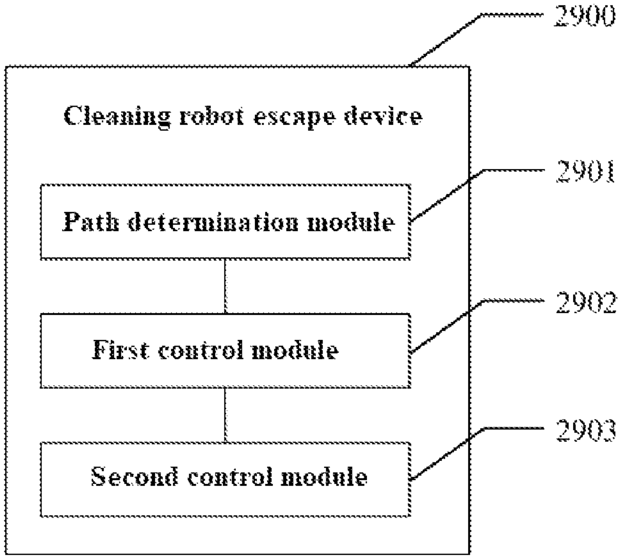
FIG. 28 shows a block diagram of a cleaning robot escape device as illustrated according to an embodiment of the present disclosure.

In an exemplary embodiment of the present disclosure, a cleaning robot escape device is further provided, which is disposed on a cleaning robot including a surface medium sensor. As shown in FIG. 28, a cleaning robot escape device 2900 may include: a path determination module 2901, a first control module 2902, and a second control module 2903.

The path determination module 2901 is configured to: detect, when the cleaning robot encounters an obstacle while cleaning along an edge of a first surface medium region and turns around, a second surface medium region in response to a surface medium change signal from the surface medium sensor; and to determine whether a path allowing the cleaning robot to bypass the second surface medium region exists.

The first control module 2902 is configured to control, if the path exists, the cleaning robot to travel along the path to avoid the second surface medium region.

The second control module 2903 is configured to ignore, if the path does not exist, the surface medium change signal from the surface medium sensor, and to control the cleaning robot to turn around and return along an original path.

The concrete details of each module in the cleaning robot escape device described above have been described in detail correspondingly in the cleaning robot escape method, and thus will not be repeated herein.

It should be noted that although several modules or units of the apparatus for execution are mentioned in the detailed description above, this division is not compulsory. In fact, the features and functions of two and more modules or units described above may be embodied in one module or unit according to an embodiment of the present disclosure. On the contrary, the features and functions of one module or unit described above may be further divided into a plurality of modules or units for embodying.

In an exemplary embodiment of the present disclosure, an electronic device capable of implementing the method described above is further provided.

As will be appreciated by those skilled in the art, various aspects of the present disclosure can be implemented as systems, methods, or program products. Accordingly, various aspects of the present disclosure can be specifically implemented in the following forms, namely: a complete hardware embodiment, a complete software embodiment (including firmware, microcode, or the like), or an embodiment combining hardware and software aspects, all of which can be collectively referred to as “circuit”, “module”, or “system” here.

Figure 29:
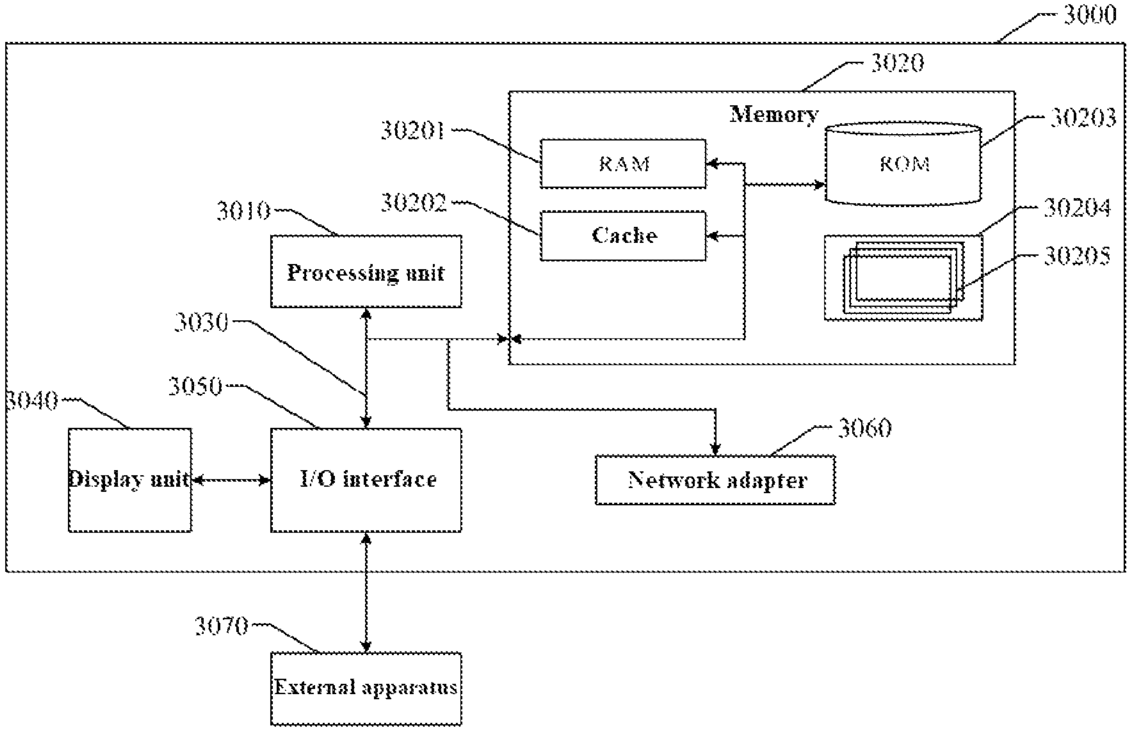
FIG. 29 shows a schematic diagram of modules in an electronic apparatus as illustrated according to an embodiment of the present disclosure.

Referring to FIG. 29, the following describes an electronic apparatus 3000 according to an embodiment of the present disclosure. The electronic device 3000 shown in FIG. 29 is merely an example, and is not intended to impose any limitation on the functionality and application scope of embodiments of the present disclosure.

As shown in FIG. 29, the electronic apparatus 3000 is represented in the form of a general-purpose computing apparatus. The electronic apparatus 3000 may include but are not limited to the following components: at least one processing unit 3010 described above, at least one memory 3020 described above, a bus 3030 connecting different system components (including the memory 3020 and the processing unit 3010), and a display unit 3040.

The memory 3020 stores program codes, which may be executed by the processing unit 3010, such that the processing unit 3010 performs the steps according to various exemplary embodiments of the present disclosure, as described in the section “Exemplary Method” of this Description. For example, the processing unit 3010 may perform the following steps as shown in FIG. 25: S2610, detecting, when the cleaning robot performs cleaning along an edge of a first surface medium region and turns around, a second surface medium region in response to a surface medium change signal from the surface medium sensor, and determining whether a path allowing the cleaning robot to bypass the second surface medium region exists; S2620, controlling, if the path exists, the cleaning robot to travel along the path to avoid the second surface medium region; and S2630, ignoring, if the path does not exist, the surface medium change signal from the surface medium sensor, and controlling the cleaning robot to turn around and return along an original path.

The memory 3020 may include a readable medium in the form of a volatile memory, for example, a random access memory (RAM) 30201 and/or a cache memory 30202, and may further include a read-only memory (ROM) 30203.

The memory 3020 may further include a program/utility tool 30204 having at least one set of (at least one) program module 30205. Such a program module 30205 includes, but is not limited to: an operation system, one or more application programs, other program modules, and program data. Each or a combination of these examples may include the implementation of a network environment.

The bus 3030 may be a local area bus, which represents one or more of several types of bus structures, and includes a memory bus or memory controller, a peripheral bus, a graphics acceleration port, a processing unit, or any bus structure using a variety of bus structures.

The electronic apparatus 3000 may also communicate with one or more external apparatuses 3070 (for example, a keyboard, a pointing apparatus, a Bluetooth apparatus, or the like), and may also communicate with one or more apparatuses enabling a user to interact with the electronic apparatus 3000, and/or any apparatus (for example, a router, a modem, or the like) enabling the electronic apparatus 3000 to communicate with one or more other computing apparatuses. Such communication may be performed via an input/output (I/O) interface 3050. Moreover, the electronic apparatus 3000 may also communicate with one or more networks (for example, a local area network (LAN), a wide area network (WAN), and/or a public network, such as the Internet) via a network adapter 3060. As shown in the figures, the network adapter 3060 may communicate with other modules of the electronic apparatus 3000 via the bus 3030. It should be understood that, although not shown in the figures, other hardware and/or software modules, including but not limited to a microcode, a device driver, a redundant processing unit, an external disk drive array, a RAID system, a tape driver, and a data backup storage system, etc., may be used in combination with the electronic apparatus 3000.

Based on the description of the embodiments above, it is easy for those skilled in the art to understand that the exemplary embodiments described here may be implemented by software, or by software combined with necessary hardware. Accordingly, the technical solutions according to the embodiments of the present disclosure can be embodied in the form of a software product, which may be stored in a non-volatile storage medium (which may be a CD-ROM, a USB flash disk, a portable hard disk, or the like) or in a network. The software product may include a number of instructions to enable a computing apparatus (which may be a personal computer, a server, a terminal device, or a network device, or the like) to perform the method according to the embodiments of the present disclosure.

In an exemplary embodiment of the present disclosure, a computer-readable storage medium is further provided, in which a program product capable of implementing the method described above in this Description is stored. In some possible embodiments, various aspects of the present disclosure may also be implemented in the form of a program product including program codes. When the program product is running on a terminal device, the program codes are used to cause the terminal device to perform the steps according to various exemplary embodiments of the present disclosure, as described in the section "Exemplary Method" of this Description.

Figure 30:
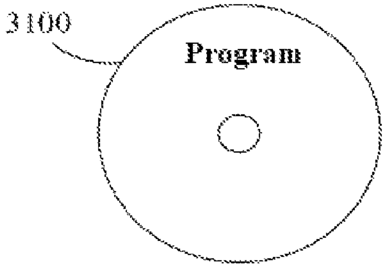
FIG. 30 shows a schematic diagram of a program product as illustrated according to an embodiment of the present disclosure.

Referring to FIG. 30, a program product 3100 according to an embodiment of the present disclosure is described for implementing the method described above. The program product may take the form of a portable compact disc read-only memory (CD-ROM) and include a program code. The program product and may run on a terminal device, for example, a personal computer. However, the program product of the present disclosure is not limited thereto. The readable storage medium herein may be any tangible medium containing or storing a program, which can be used by or in combination with an instruction execution system, device or means.

The program product may include one readable medium or any combination of more readable media. The readable medium may be a readable signal medium or a readable storage medium. The readable storage medium may be, for example, but not limited to, an electrical, magnetic, optical, electromagnetic, infrared, or semiconductor system, device or means, or a combination of any of the above. More specific examples (non-exhaustive list) of the readable storage medium include: an electrical connection having one or more leads, a portable disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The computer-readable signal medium may include a data signal propagated in a baseband or as part of a carrier, and a readable program code is carried in the computer-readable signal medium. Such a propagated data signal may take a variety of forms, including but not limited to an electromagnetic signal, an optical signal, or any suitable combination of the above. The readable signal medium may further be any readable medium other than a readable storage medium. The readable medium may send, propagate, or transmit a program used by or in combination with an instruction execution system, apparatus, or device.

The program code included in the readable medium may be transmitted by using any suitable medium, which includes but is not limited to wireless means, wired means, optical cables, RF, etc., and any suitable combination of the above.

The program code for executing operations of the present disclosure may be written in any combination of one or more programming languages, which include object-oriented programming languages such as Java and C++, as well as conventional procedural programming languages such as C language or similar programming languages. The program code may be executed entirely on a user computing apparatus, executed partially on a user equipment, executed as a stand-alone software package, executed partially on the user computing apparatus and partially on a remote computing apparatus, or executed entirely on the remote computing apparatus or a server. In a case where the remote computing device is involved, the remote computing device may be connected to the user computing device via any type of network including a local area network (LAN) or a wide area network (WAN), or may be connected to an external computing device (for example, via Internet by means of an Internet service provider).

Furthermore, the above drawings are merely schematic illustrations of the processes included in the method according to the exemplary embodiments of the present disclosure, and are not for limiting purposes. It is easy to understand that the processes shown in the drawings above do not imply or limit the time sequence of these processes. In addition, it is also easy to understand that these processes may be performed synchronously or asynchronously, for example, in a plurality of modules.

Other embodiments of the present disclosure are readily conceivable to those skilled in the art from consideration of the specification and the practice of the present disclosure herein. The present application is intended to cover any variations, uses, or adaptations of the present disclosure following the general principles of the present disclosure and including the common knowledge or conventional technical means in the art, which are not disclosed in the present disclosure. The Description and embodiments are considered to be illustrative only, and the true scope and spirit of the present disclosure are set forth by the claims.

It will be appreciated that the present disclosure is not limited to the exact construction that has been described above and shown in the accompanying drawings, and that various modifications and changes can be made without departing from the scope thereof. It is intended that the scope of the present disclosure is only defined by the appended claims.

What is claimed is:

1. A cleaning robot escape method for a cleaning robot comprising a surface medium sensor, wherein the method comprises:

detecting, when the cleaning robot performs cleaning along an edge of a first surface medium region and turns around, a second surface medium region in response to a surface medium change signal from the surface medium sensor, and determining, by a processor, whether a path allowing the cleaning robot to bypass the second surface medium region exists;

controlling, by the processor, if the path exists, the cleaning robot to travel along the path to avoid the second surface medium region; and ignoring, if the path does not exist, the surface medium change signal from the surface medium sensor, and controlling, by the processor, the cleaning robot to turn around and return along an original path.

2. The cleaning robot escape method according to claim 1, wherein the method further comprises:

searching in an established room map to determine whether the second surface medium region exists in the room map;

determining, if the second surface medium region exists in the room map, whether the path exists based on a boundary of the second surface medium region and the room map, and controlling, if the path exists, the cleaning robot to travel along the path to avoid the second surface medium region and then enter a normal cleaning mode; and scanning, if the second surface medium region does not exist in the room map, an edge of the second surface medium region, and storing a scanning result in the room map.

3. The cleaning robot escape method according to claim 1, wherein during the process of ignoring the surface medium change signal from the surface medium sensor and controlling the cleaning robot to turn around and return along the original path, the method further comprises:

detecting whether the surface medium change signal from the surface medium sensor disappears; and controlling, if the surface medium change signal from the surface medium sensor disappears, the cleaning robot to continue advancing by a preset distance and then stop and rotate a single revolution, and detecting whether the cleaning robot has escaped from the second surface medium region.

4. The cleaning robot escape method according to claim 3, wherein the detecting whether the cleaning robot has escaped from the second surface medium region comprises:

controlling, if the surface medium sensor triggers the surface medium change signal, the cleaning robot to continue returning along the original path; and entering, if the surface medium sensor does not trigger the surface medium change signal, the normal cleaning mode.

5. The cleaning robot escape method according to claim 4, wherein the surface medium sensor triggering the surface medium change signal comprises:

controlling the surface medium sensor to transmit a signal perpendicularly to a current surface, and receiving an actual echo signal reflected by the current surface; and determining whether the actual echo signal is different from an echo signal from the first surface medium region, and triggering, if a difference exists, the surface medium change signal by the surface medium sensor, wherein the surface medium sensor is an ultrasonic sensor.

6. The cleaning robot escape method according to claim 1, wherein the controlling the cleaning robot to turn around and return along the original path comprises:

controlling, when it is determined that the cleaning robot has escaped from the second surface medium region, the cleaning robot to rotate in situ, so that a traveling direction of the cleaning robot is parallel to the edge of the first surface medium region; and controlling the cleaning robot to return in the traveling direction.

7. The cleaning robot escape method according to claim 1, wherein the method is used for the cleaning robot in a mode where only the first surface medium region is cleaned.

8. A computer-readable storage medium, configured to store a computer program therein, wherein the computer program is configured, when executed by a processor, to implement a cleaning robot escape method for a cleaning robot comprising a surface medium sensor, wherein the method comprises:

detecting, when the cleaning robot performs cleaning along an edge of a first surface medium region and turns around, a second surface medium region in response to a surface medium change signal from the surface medium sensor, and determining whether a path allowing the cleaning robot to bypass the second surface medium region exists;

controlling, if the path exists, the cleaning robot to travel along the path to avoid the second surface medium region; and ignoring, if the path does not exist, the surface medium change signal from the surface medium sensor, and controlling the cleaning robot to turn around and return along an original path.

9. An electronic apparatus, comprising:

a processor; and a memory, configured for storing an executable instruction executable by the processor, wherein the processor is configured, when executing the executable instruction, to perform a cleaning robot escape method for a cleaning robot comprising a surface medium sensor, wherein the method comprises:

detecting, when the cleaning robot performs cleaning along an edge of a first surface medium region and turns around, a second surface medium region in response to a surface medium change signal from the surface medium sensor, and determining whether a path allowing the cleaning robot to bypass the second surface medium region exists;

controlling, if the path exists, the cleaning robot to travel along the path to avoid the second surface medium region; and ignoring, if the path does not exist, the surface medium change signal from the surface medium sensor, and controlling the cleaning robot to turn around and return along an original path.

10. The electronic apparatus according to claim 9, wherein the method further comprises:

searching in an established room map to determine whether the second surface medium region exists in the room map;

determining, if the second surface medium region exists in the room map, whether the path exists based on a boundary of the second surface medium region and the room map, and controlling, if the path exists, the cleaning robot to travel along the path to avoid the second surface medium region and then enter a normal cleaning mode; and scanning, if the second surface medium region does not exist in the room map, an edge of the second surface medium region, and storing a scanning result in the room map.

11. The electronic apparatus according to claim 9, wherein during the process of ignoring the surface medium change signal from the surface medium sensor and controlling the cleaning robot to turn around and return along the original path, the method further comprises:

detecting whether the surface medium change signal from the surface medium sensor disappears; and controlling, if the surface medium change signal from the surface medium sensor disappears, the cleaning robot to continue advancing by a preset distance and then stop and rotate a single revolution, and detecting whether the cleaning robot has escaped from the second surface medium region.

12. The electronic apparatus according to claim 11, wherein the detecting whether the cleaning robot has escaped from the second surface medium region comprises:

controlling, if the surface medium sensor triggers the surface medium change signal, the cleaning robot to continue returning along the original path; and entering, if the surface medium sensor does not trigger the surface medium change signal, the normal cleaning mode.

13. The electronic apparatus according to claim 12, wherein the surface medium sensor triggering the surface medium change signal comprises:

controlling the surface medium sensor to transmit a signal perpendicularly to a current surface, and receiving an actual echo signal reflected by the current surface; and determining whether the actual echo signal is different from an echo signal from the first surface medium region, and triggering, if a difference exists, the surface medium change signal by the surface medium sensor, wherein the surface medium sensor is an ultrasonic sensor.

14. The electronic apparatus according to claim 9, wherein the controlling the cleaning robot to turn around and return along the original path comprises:

controlling, when it is determined that the cleaning robot has escaped from the second surface medium region, the cleaning robot to rotate in situ, so that a traveling direction of the cleaning robot is parallel to the edge of the first surface medium region; and controlling the cleaning robot to return in the traveling direction.

15. The electronic apparatus according to claim 9, wherein the method is used for the cleaning robot in a mode where only the first surface medium region is cleaned.

* * * * *